United States Patent
Saito et al.

(10) Patent No.: US 9,501,520 B2
(45) Date of Patent: Nov. 22, 2016

(54) INFORMATION PROCESSING APPARATUS FOR OBTAINING INFORMATION RELATED TO A KEYWORD IN AN EMAIL MESSAGE

(71) Applicant: SONY CORPORATION, Tokyo (JP)

(72) Inventors: Mari Saito, Kanagawa (JP); Noriyuki Yamamoto, Kanagawa (JP); Hiroyuki Hourin, Tokyo (JP); Kazunori Ohmura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 13/780,517

(22) Filed: Feb. 28, 2013

(65) Prior Publication Data

US 2013/0173660 A1 Jul. 4, 2013

(30) Foreign Application Priority Data

Feb. 20, 2000 (JP) .................................. 2000-042303
Feb. 21, 2000 (JP) .................................. 2000-042305
Jun. 22, 2000 (JP) .................................. 2000-187152

(51) Int. Cl.
*G06F 7/00* (2006.01)
*G06F 17/30* (2006.01)
*G06F 17/27* (2006.01)

(52) U.S. Cl.
CPC ....... *G06F 17/30424* (2013.01); *G06F 17/277* (2013.01); *G06F 17/2775* (2013.01); *G06F 17/30014* (2013.01); *G06F 17/3061* (2013.01); *G06F 17/30882* (2013.01)

(58) Field of Classification Search
CPC .................................................. G06F 17/30864
USPC .......................... 707/738, 740, 755; 715/706
See application file for complete search history.

(56) References Cited

U.S. PATENT DOCUMENTS

| | | | | |
|---|---|---|---|---|
| 4,481,577 A | * | 11/1984 | Forson .................. | G06F 9/4448 364/200 |
| 5,542,090 A | * | 7/1996 | Henderson et al. .......... | 395/600 |
| 5,598,557 A | | 1/1997 | Doner et al. | |
| 5,608,449 A | * | 3/1997 | Swafford et al. ............... | 725/74 |
| 5,799,268 A | | 8/1998 | Boguraev | |
| 5,873,107 A | | 2/1999 | Borovoy et al. | |
| 5,974,412 A | | 10/1999 | Hazlehurst et al. | |

(Continued)

FOREIGN PATENT DOCUMENTS

| | | |
|---|---|---|
| JP | 10-93620 | 4/1998 |
| JP | 10-093620 | 4/1998 |

(Continued)

OTHER PUBLICATIONS http://en.wikipedia.org/wiki/Office_Assistant.*

(Continued)

*Primary Examiner* — Marc Somers
(74) *Attorney, Agent, or Firm* — Oblon, McClelland, Maier & Neustadt, L.L.P.

(57) ABSTRACT

Disclosed is an information processing apparatus, an information processing method, and a program storage medium which can present associated information related to a document to be processed to a user. An accumulation block accumulates a database of associated information. A presentation block presents to the user the associated information corresponding to the document to be processed at occurrence of an event. An agent control block controls the manner of displaying an agent for example.

20 Claims, 23 Drawing Sheets

(56) References Cited

U.S. PATENT DOCUMENTS

| | | | |
|---|---|---|---|
| 6,070,158 A | 5/2000 | Kirsch et al. | |
| 6,094,681 A * | 7/2000 | Shaffer et al. | 709/224 |
| 6,108,640 A | 8/2000 | Slotznick | |
| 6,134,548 A | 10/2000 | Gottsman et al. | |
| 6,141,662 A | 10/2000 | Jeyachandran | |
| 6,199,076 B1 | 3/2001 | Logan et al. | |
| 6,212,517 B1 * | 4/2001 | Sato et al. | 707/749 |
| 6,253,208 B1 | 6/2001 | Wittgreffe et al. | |
| 6,272,493 B1 | 8/2001 | Pasquali | |
| 6,340,977 B1 * | 1/2002 | Lui et al. | 715/709 |
| 6,341,279 B1 | 1/2002 | Nye | |
| 6,421,675 B1 | 7/2002 | Ryan et al. | |
| 6,434,745 B1 | 8/2002 | Conley et al. | |
| 6,442,549 B1 | 8/2002 | Schneider | |
| 6,493,702 B1 | 12/2002 | Adar et al. | |
| 6,567,800 B1 | 5/2003 | Barrera et al. | |
| 6,601,059 B1 * | 7/2003 | Fries | 707/3 |
| 6,629,106 B1 | 9/2003 | Narayanaswamy et al. | |
| 6,654,735 B1 * | 11/2003 | Eichstaedt et al. | 707/749 |
| 6,845,486 B2 * | 1/2005 | Yamada et al. | 715/706 |
| 2002/0038308 A1 | 3/2002 | Cappi | |
| 2002/0083031 A1 * | 6/2002 | De Varax | 707/1 |
| 2002/0105533 A1 * | 8/2002 | Cristo | 345/706 |
| 2004/0024739 A1 | 2/2004 | Copperman et al. | |
| 2011/0264507 A1 * | 10/2011 | Zhou et al. | 705/14.42 |

FOREIGN PATENT DOCUMENTS

| | | |
|---|---|---|
| JP | 10-107833 | 4/1998 |
| JP | 11-065965 | 3/1999 |
| JP | 11-346267 | 12/1999 |

OTHER PUBLICATIONS

A. Moukas, et al., Agents '97 Conference Proceedings, 10 pages, "Evolving a Multi-Agent Information Filtering Solution in Amalthaea", 1997.

M. Fleming, et al., Proceeding of UM99: $7^{th}$ International Conference on User Modeling, pp. 67-76, "User Modeling in the Design of Interactive Interface Agents", Jun. 20-24, 1999.

Widyantoro, Dwi et al., An Adaptive Algorithm for Learning Changes in User Interests, CIKM '99, pp. 405-411, ACM 1999.

Rhodes, Bradley and Thad Starner, Remembrance Agent: A continuously running automated information retrieval system, AAAI Technical Report SS-96-02, pp. 122-125 (1996).

Lachman, Richard, Animist Interface: Experiments in Mapping Character Animation to Computer Interface, MIT (1997).

Horvitz, Eric et al., The Lumiere Project: Baysian User Modeling for Inferring the Goals and Needs of Software Users, Proceedings of the Fourteenth Conference on Uncertainty in Artificial Intellivence, Jul. 1998, pp. 256-265.

* cited by examiner

F I G. 3
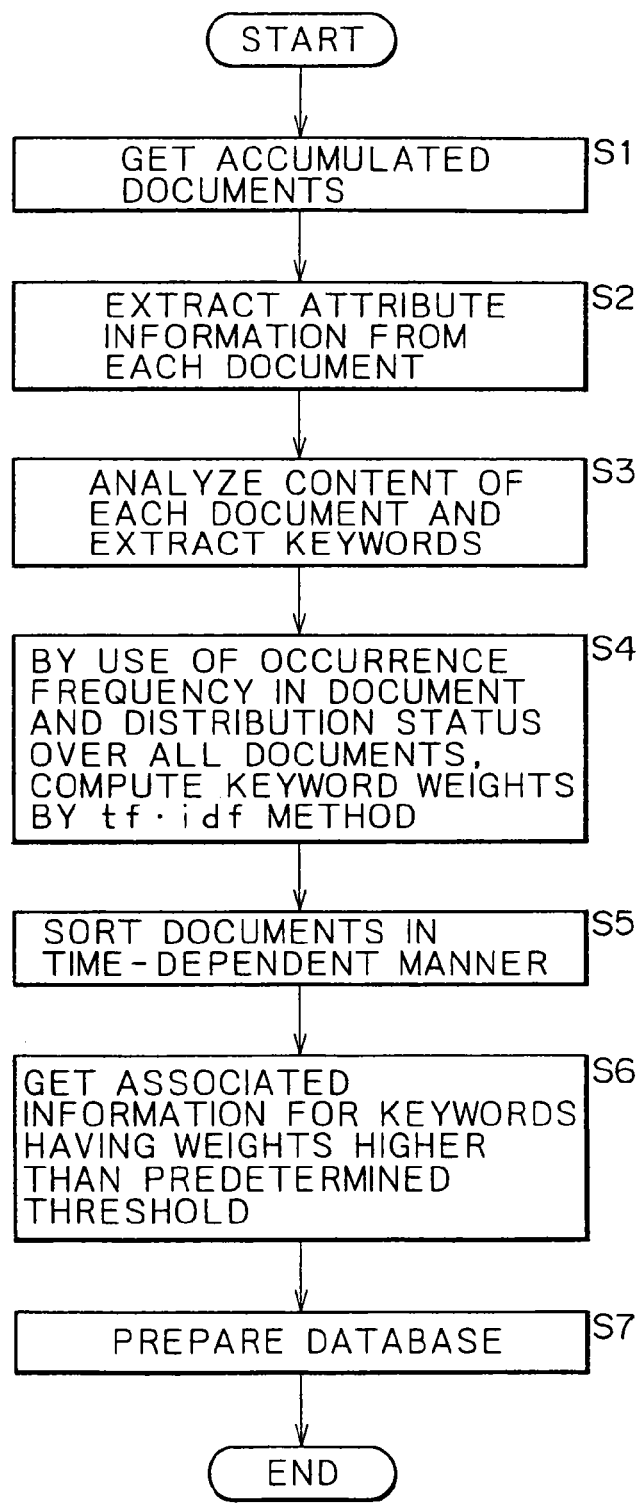

F I G. 10

☐ MAIL GROUP FOR WHICH URL HAS BEEN EXECUTED [▶] TIMES IS DETERMINED TO BE UPDATED

☐ MAIL GROUP WHICH FULLY USED URL IS DETERMINED TO BE UPDATED

☐ MAIL GROUP [▶] DAYS AFTER LAST UPDATE IS DETERMINED TO BE UPDATED

☐ MAIL GROUP UPDATED IN SEARCH KEYWORD BY ANALYSIS OF NEWLY RECEIVED MAIL IS DETERMINED TO BE UPDATED

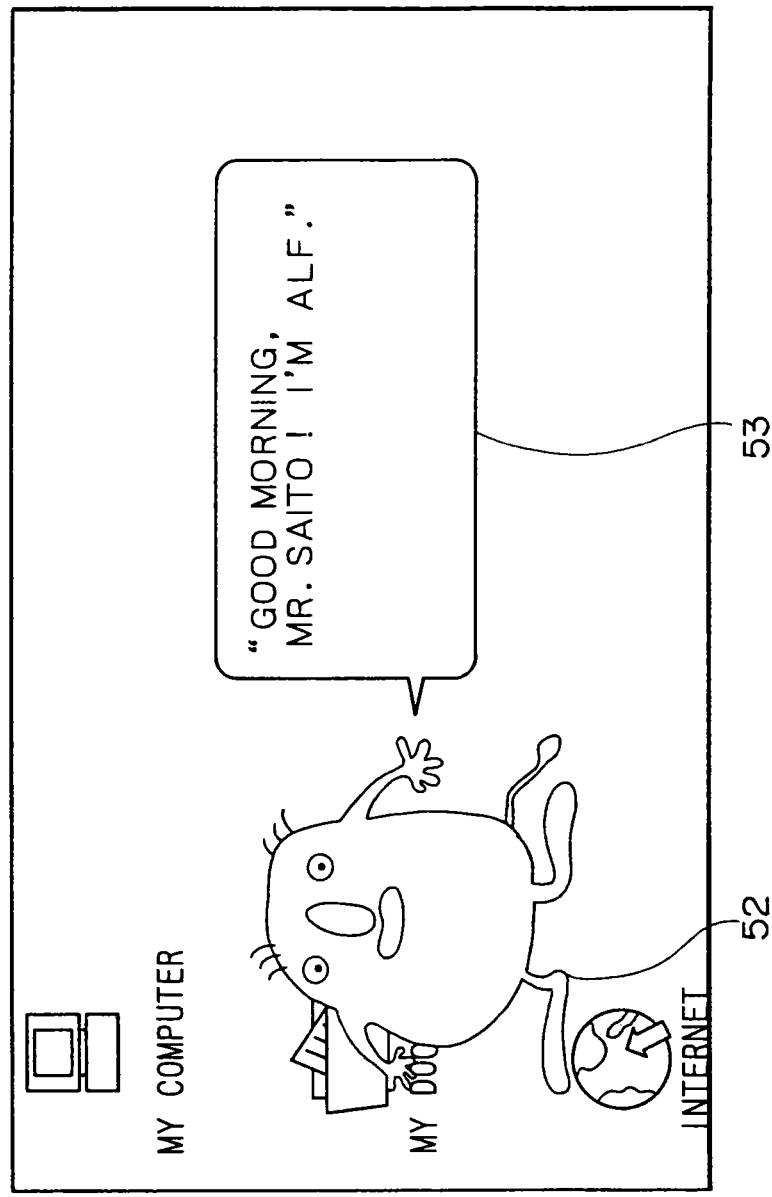

F I G.14
F I G.15
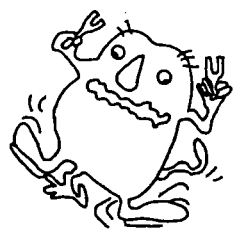

F I G. 23A
F I G. 23B
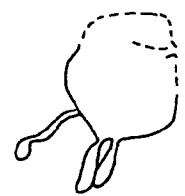
F I G. 23C
F I G. 23D

INFORMATION PROCESSING APPARATUS FOR OBTAINING INFORMATION RELATED TO A KEYWORD IN AN EMAIL MESSAGE

CROSS-REFERENCE TO RELATED APPLICATIONS

This application is a continuation application of U.S. application Ser. No. 09/785,204, filed Feb. 20, 2001, the entire contents of which is incorporated herein by reference, and claims priority to Japanese Patent Application Nos. JP 2000-187152 filed Jun. 22, 2000, JP 2000-042303 filed on Feb. 21, 2000, and JP 2000-042305 filed Feb. 21, 2000.

BACKGROUND OF THE INVENTION

The present invention relates generally to an information processing apparatus, an information processing method, and a program storage medium and, more particularly, to an information processing apparatus, an information processing method, and a program storage medium that are adapted to retrieve, from a database, the information associated with the contents of transferred electronic mails for example.

Application programs are known for displaying characters called so-called desktop mascots on the desktop (or display screen) of personal computers.

The desktop mascots have capabilities of notifying users of the transfer of electronic mails and moving around on the desktop for example.

It would be convenient for computer users if a desktop mascot brings up information associated with a document which is to be inputted for transmission as an electronic mail or has been received for viewing (hereafter, such information is referred to as associated information). In addition, such a desktop mascot would become an object of users' affection or amusement, thereby making the desktop pleasant. The problem here is that there has been no such a mascot.

Presentation of the associated information requires to prepare a database that stores the associated information. However, this takes a lot of time and effort in data inputting for example.

SUMMARY OF THE INVENTION

An object of the present invention is to provide an information processing apparatus, an information processing method, and a program storage medium which allow the automatic construction of the database storing the associated information by use of already processed text files and the user presentation of the associated information about documents for transfer.

To achieve the above object, according to an aspect of the present invention, there is provided an information processing apparatus for detecting a keyword from a text file corresponding to an event that has taken place and displaying associated information corresponding to the keyword. The information processing apparatus includes extraction means for extracting attribute information from an existing text file; selection means for selecting an important word from among words contained in the existing text file; acquisition means for acquiring the associated information related to the important word selected by the selection means; database construction means for constructing a database by use of at least one of the attribute information extracted by the extraction means and the associated information acquired by the acquisition means; event occurrence detection means for detecting the occurrence of the event; keyword detection means for detecting a keyword from the text file corresponding to the event detected by the event occurrence detection means; search means for searching the database constructed by the database construction means for the associated information corresponding to the keyword detected by the keyword detection means; and display control means for controlling displaying of the associated information retrieved by the search means.

According to another aspect of the present invention, there is provided an information processing method for an information processing apparatus for detecting a keyword from a text file corresponding to an event that has taken place and displaying associated information corresponding to the keyword. The information processing method includes the steps of: extracting attribute information from an existing text file; selecting an important word from among words contained in the existing text file; acquiring the associated information related to the important word selected in the selecting step; constructing a database by use of at least one of the attribute information extracted in the extraction step and the associated information acquired in the acquiring step; detecting the occurrence of the event; detecting a keyword from the text file corresponding to the event detected in the event occurrence detecting step; searching the database constructed in the database constructing step for the associated information corresponding to the keyword detected in the keyword detecting step; and controlling displaying of the associated information retrieved in the searching step.

According to still another aspect of the present invention, there is provided a program storage medium storing a computer-readable program for detecting a keyword from a text file corresponding to an event that has taken place and displaying associated information related to the keyword. The program storage medium includes the steps of: extracting attribute information from an existing text file; selecting an important word from among words contained in the existing text file; acquiring the associated information related to the important word selected in the selecting step; constructing a database by use of at least one of the attribute information extracted in the extraction step and the associated information acquired in the acquiring step; detecting the occurrence of the event; detecting a keyword from the text file corresponding to the event detected in the event occurrence detecting step; searching the database constructed in the database constructing step for the associated information corresponding to the keyword detected in the keyword detecting step; and controlling displaying of the associated information retrieved in the searching step.

According to a further aspect of the present invention, there is provided an information processing apparatus for displaying a character on a display device and for displaying associated information related to a text file processed by a predetermined application program. The information processing apparatus includes: processing detection means for detecting, as an event, predetermined processing of the predetermined application program; keyword detection means for detecting a keyword from the text file processed by the predetermined application program corresponding to the event detected by the detection means; search means for searching a database for the associated information corresponding to the keyword detected by the detection means; input means for inputting a command; command processing means for executing, in response to the command inputted by the input means, processing on the associated information retrieved by the search means; and display control means for displaying, in response to the event detected by the processing detection means, the character onto the display device and changing a manner of displaying the character in response to the command inputted by the input means.

According to a still further aspect of the present invention, there is provided an information processing method for an information processing apparatus for displaying a character on a display device and for displaying associated information related to a text file processed by a predetermined application program. The information processing method includes the steps of: detecting, as an event, predetermined processing of the predetermined application program; detecting a keyword from the text file processed by the predetermined application program corresponding to the event detected in the processing detecting step; searching a database for the associated information corresponding to the keyword detected in the keyword detecting step; inputting a command; executing, in response to the command inputted in the inputting step, processing on the associated information retrieved in the searching step; and displaying, in response to the event detected in the processing of the detecting step, the character onto the display device and changing a manner of displaying the character in response to the command inputted in the inputting step.

According to another aspect of the present invention, there is provided a program storage medium storing a computer-readable program for displaying a character on a display device and for displaying associated information related to a text file processed by a predetermined application program. The program storage medium includes the steps of: detecting, as an event, predetermined processing of the predetermined application program; detecting a keyword from the text file processed by the predetermined application program corresponding to the event detected in the processing detecting step; searching a database for the associated information corresponding to the keyword detected in the keyword detecting step; executing, in response to a command inputted, processing on the associated information retrieved in the searching step; and displaying, in response to the event detected in the processing of the detecting step, the character onto the display device and changing a manner of displaying the character in response to the command inputted.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a flowchart for describing database preparation processing by the agent program.

FIG. 10 is a display example of a user interface through which conditions for updating a database are entered.

FIG. 13 is a display example of a balloon 53 in which a script of the agent 52 is shown.

FIG. 14 is a display example in which the agent 52 is in a wait state.

FIG. 15 is a display example in which the agent 52 is performing a job.

FIGS. 23A to 23D are display examples in which the agent 52 moves horizontally.

DESCRIPTION OF THE PREFERRED EMBODIMENTS

Figure 1:
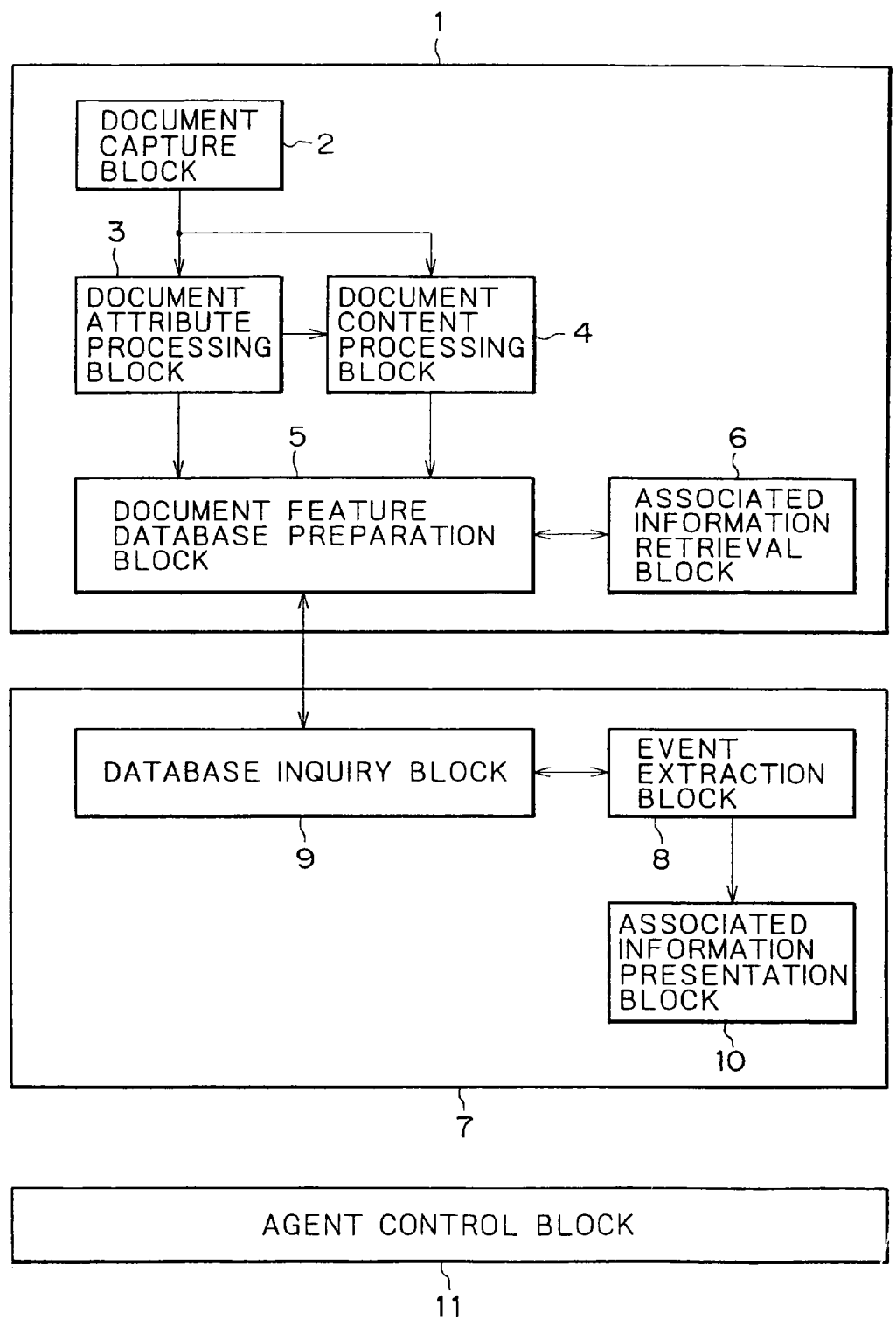
FIG. 1 is a block diagram illustrating an exemplary configuration of functional blocks constituting an agent program according to the invention.

Now, referring to FIG. 1, there is shown a functional block diagram illustrating an application program (hereafter referred to as an agent program) for displaying, on the desktop of a computer, a desktop mascot (hereafter referred to as an agent) to which the present invention is applied. The agent program is installed in a personal computer for example (details of which will be described with reference to FIG. 2) for execution.

The functional blocks of the agent program are an accumulation block 1 for constructing a database by accumulating the associated information (to be described later) about a document to be processed, a presentation block 7 for presenting the associated information corresponding to a document to be processed, and an agent control block 11 for controlling the displaying of the agent.

A document capture block 2 of the accumulation block 1 captures a document not yet processed by the user from those transferred by an application program (hereafter referred to as a mailer) for transferring electronic mails or edited by a wordprocessor program and supplies the captured document to a document attribute processing block 3 and a document content processing block 4. In what follows, the description will be made by use of documents transferred by the mailer as electronic mails for example.

The document attribute processing block extracts the attribute information of a document supplied from the document capture block 2 and, on the basis of the extracted attribute information, divides the document into groups to supply them to the document content processing block 4 and a document feature database preparation block 5. In the case of an electronic mail, the information [the message ID for identifying this electronic mail, the message ID of an electronic mail in reference ("References" or "In-Reply-To"), the destination ("To", "Cc", or "Bcc"), the source of transmission ("From"), and the date ("Date")] described in the header of the electronic mail as the attribute of that document is extracted.

The document content processing block 4 extracts the contents of the documents grouped by the document attribute processing block 3, performs a morphemic analysis on the extracted contents to divide them into keywords (or words), obtains the frequency of occurrence of the keywords and their distribution status over plural documents, and computes a keyword weight (a value indicative of the degree of association with the main point of a document) for each document group. For the keyword weight computation, the tf•idf method is used for example (Reference: Salton, G., Automatic Text Processing; The Transformation, Analysis, and Retrieval of Information by Computer, Addison-Wesley, 1989). However, those words which are widely distributed, namely included in almost all documents, for example "I" and "You", do not provide keywords and therefore are excluded from the weight computation.

For every document group obtained by the document attribute processing block 3, the document feature database preparation block 5 creates a database of the attribute information of each document and the keyword weights of all keywords contained in each document and stores the database in a storage block 29 (refer to FIG. 2) implemented by a hard disk drive for example. In addition, the document feature database preparation block 5 selects search keywords (or important keywords) on the basis of the keyword weights and records the selected search keywords. Further, the document feature database preparation block 5 supplies the search keywords to an associated information retrieval block 6 and records the associated information returned in response therefrom by relating the associated information with the search keywords.

The associated information retrieval block 6 retrieves the associated information of the search keywords selected and recorded by the document feature database preparation block 5 and returns an index of the retrieved associated information to the document feature database preparation block 5. For the retrieval of keyword associated information, a search engine available on the Internet for example may be used. In this case, the URLs (Uniform Resource Locators) or titles of the retrieved web pages are returned as the associated information to the document feature database preparation block 5.

An event extraction block 8 of the presentation block 7 detects the end of the transfer of an electronic mail by the mailer or the exceeding of the text data quantity of a document being edited over a predetermined threshold and sends the detection to a database inquiry block 9. In what follows, the end of the transfer and the exceeding of the text data quantity are referred to as the occurrence of events.

In response to the notification of an event occurrence from the event extraction block 8, the database inquiry block 9 captures the document (for example, a received electronic mail) which corresponds to the event occurrence to extract the attribute information and keyword from this document in the same manner as with the document attribute processing block 3 and the document content processing block 4. Further, by use of the obtained attribute information and keyword as a search conditions, the database inquiry block 9 searches the database created by the document feature database preparation block 5 for those keywords of which weights satisfy a predetermined condition (details of which will be described with reference to FIG. 6) and supplies the associated information corresponding to the retrieved keywords to an associated information presentation block 10 via the event extraction block 8.

The associated information presentation block 10 displays on the desktop the associated information supplied from the database inquiry block 9 via the event extraction block 8.

It should be noted that the preparation and updating of the database in the processing by the accumulation block 1 are executed in a predetermined timed relation (which will be described with reference to FIGS. 9 and 10.) On the other hand, the processing of the presentation block 7 is executed every time the event extraction block 8 detects an event occurrence.

Figure 2:
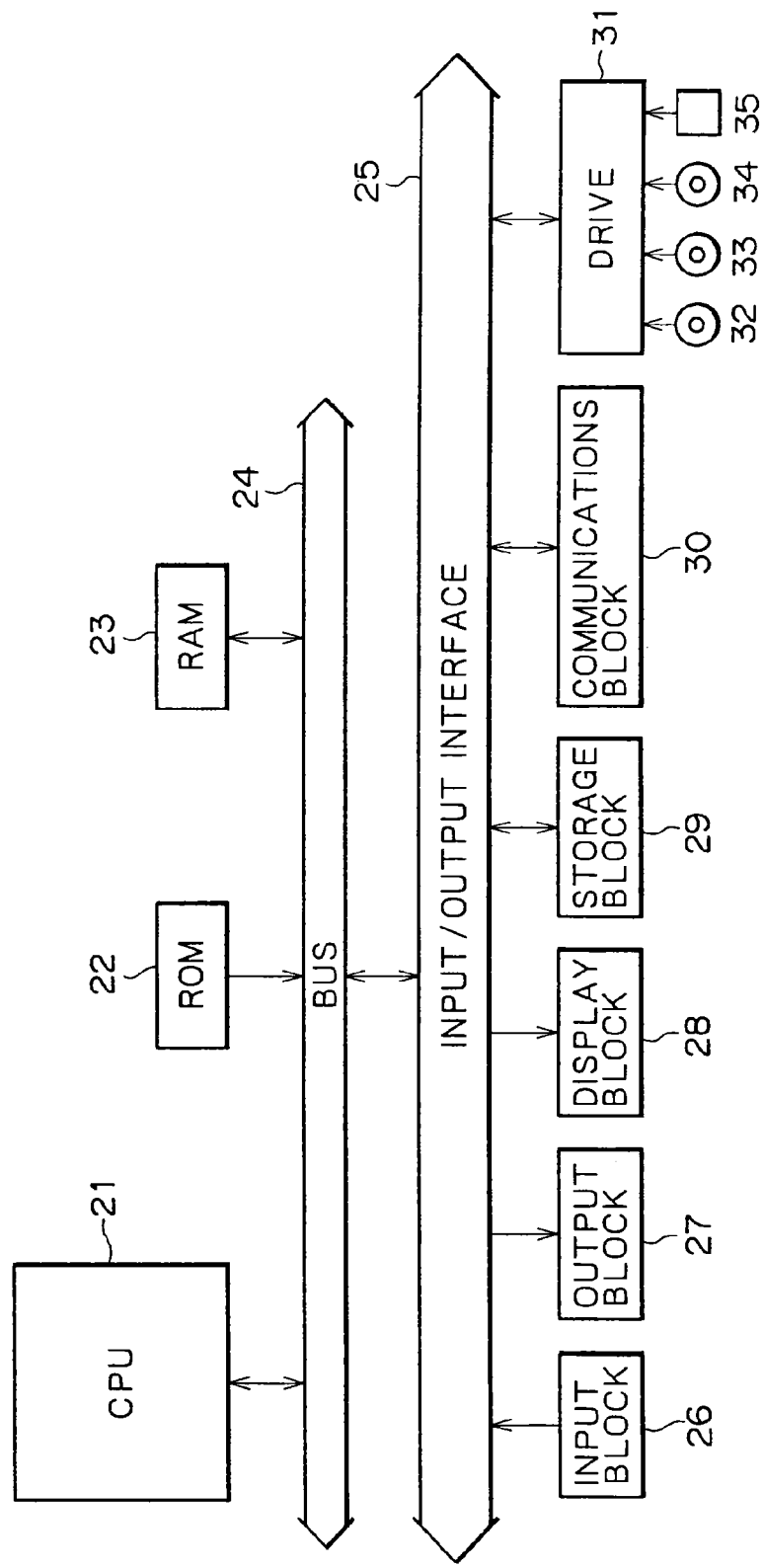
FIG. 2 is a block diagram illustrating an exemplary configuration of a personal computer in which the agent program is installed for execution.

Referring to FIG. 2, there is shown a schematic diagram illustrating an exemplary configuration of a personal computer on which the agent program is installed for execution.

The personal computer incorporates an CPU (Central Processing Unit) 21. The CPU 21 is connected to an input/output interface 25 via a bus 24. The input/output interface 25 is connected to an input block 26 composed of input device such as a keyboard and a mouse or the like, an output block 27 for outputting processing results, for example, audio signals, a display block 28 composed of a display device for showing the images of the processing results, the storage block 29 composed of a hard disk drive for example for storing programs and data, a communications block 30 composed of a modem for example for transferring transmitting and receiving data via a LAN (Local Area Network) or the Internet, and a drive 31 for reading and writing data on program storage media such as a magnetic disk 32, an optical disk 33, an magneto-optical disk 34, and a semiconductor memory 35. The bus 24 is connected to a ROM (Read Only Memory) 22 and a RAM (Random Access Memory) 23.

The agent program according to the invention is supplied to the personal computer from one of the magnetic disk 32 through the semiconductor memory 35 and read by the drive 31 to be installed on a hard disk drive incorporated in the storage block 29. The agent program thus stored in the storage block 29 is loaded therefrom into the RAM 23 by a command issued from the CPU 21 in response to a command inputted by the user from the input block 26. It will be apparent that the agent program may be automatically executed when the personal computer starts up.

The hard disk drive incorporated in the storage block 29 also stores application programs such as a WWW browser, a mailer, and a wordprocessor, which, like the agent program, are loaded from the storage block 29 into the RAM 23 by a command issued from the CPU 21 in response to a start command inputted by the user from the input block 26.

The following describes the database preparation processing of the agent program with reference to the flowchart shown in FIG. 3. This database preparation processing is one of the processes to be executed by the agent program and therefore starts if no database has been prepared when the agent program is executed.

In step S1, the document capture block 2 takes an unprocessed document (for example, an electronic mail transferred after the last database preparation processing) out of the hard disk drive incorporated in the storage block 29 and supplies this document to the document attribute processing block 3 and the document content processing block 4.

In step S2, the document attribute processing block 3 extracts attribute information (the header information such as message ID) from the electronic mail document supplied from the document capture block 2 and, on the basis of the attribute information, divides the document into groups to supply them to the document content processing block 4 and the document feature database preparation block 5. It is to be noted that the document here is not necessarily divided into groups.

In step S3, the document content processing block 4 extracts the text data of the main body of each of the groups created by the document attribute processing block 3 and performs a morphemic analysis on the extracted text data to extract keywords. The document content processing block 4 obtains the occurrence frequency of the keywords and the distribution status over plural documents and computes the weight of the keyword of each document group by use of the tf•idf method for example.

Figure 4:
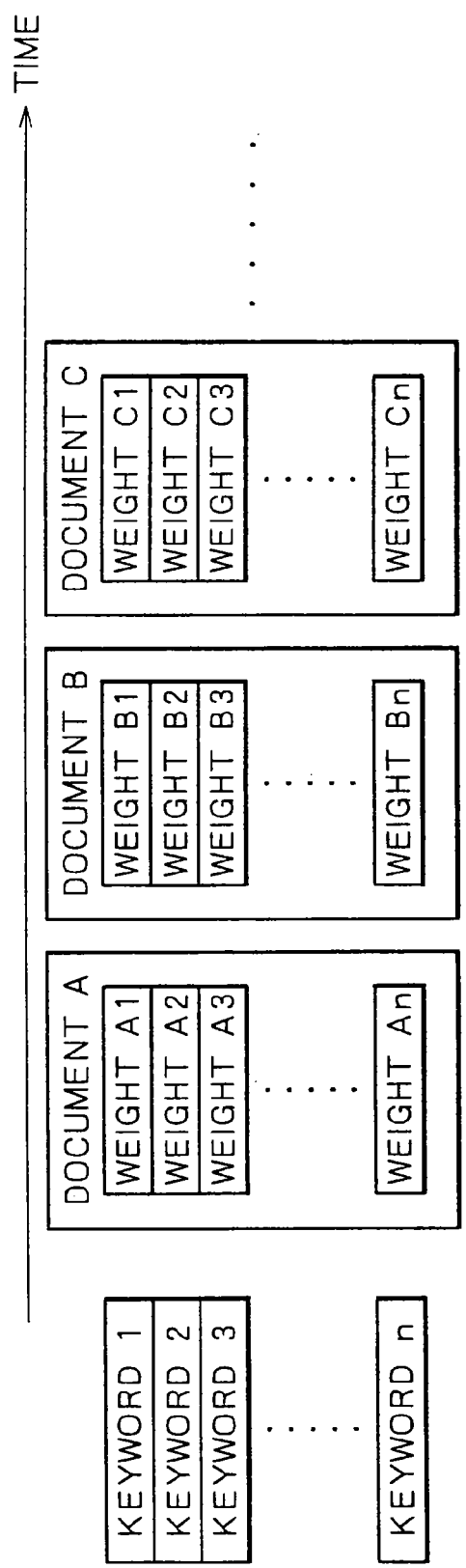
FIG. 4 is a diagram for describing a process of step S5 of FIG. 3.

In step S5, the document feature database preparation block 5 creates a database of the attribute information and the weights of all keywords included in each of the documents grouped by the document attribute processing block 3. To be more specific, as shown in FIG. 4, the grouped documents are sorted in a time dependent manner and then the weights of all keywords 1 through n included in the grouped documents are sorted in a time dependent manner, storing the results in the storage block 29. In FIG. 4, weight A1 denotes the weight value of keyword 1 in document A and weight B2 denotes the weight value of keyword 2 in document B for example. Further, if keyword 1 is not included in document B, weight B1 becomes 0.

In step S6, the document feature database preparation block 5 selects a keyword with its weight being higher than a predetermined threshold as a search keyword (an important word) and selects the number of keywords specified in the descending order of weights, supplying the selected keywords to the associated information retrieval block 6. By use of the search keyword supplied from the document feature database preparation block 5 as a search condition, the associated information retrieval block 6 accesses a search engine on the Internet to retrieve search results and outputs the URL and title of the obtained Web page to the document feature database preparation block 5 as the associated information.

In step S7, the document feature database preparation block 5 records the associated information supplied from the associated information retrieval block 6 into the storage block 29 by relating the associated information with the search keyword, thereby preparing a database. It should be noted that the processing of step S6 and the processing of step S7 may be executed in continuation from the processing in step S5 and before or may be executed in a predetermined timed relation without continuation.

Thus, the execution of the database preparation processing in a predetermined frequency accumulates the associated information corresponding to the transferred electronic mail document into the database. It should be noted that the database preparation processing may be started in a desired timing relation. Further, the database thus created is updated every time a predetermined condition is satisfied (the updating timing will be described with reference to FIGS. 9 and 10).

In order for the user to forcibly discontinue the database preparation processing, the document processed up to the discontinuation directed a discontinuation request is recorded. The database preparation processing is restarted with a document subsequent to the recorded document when a restart request is made by the user.

Figure 5:
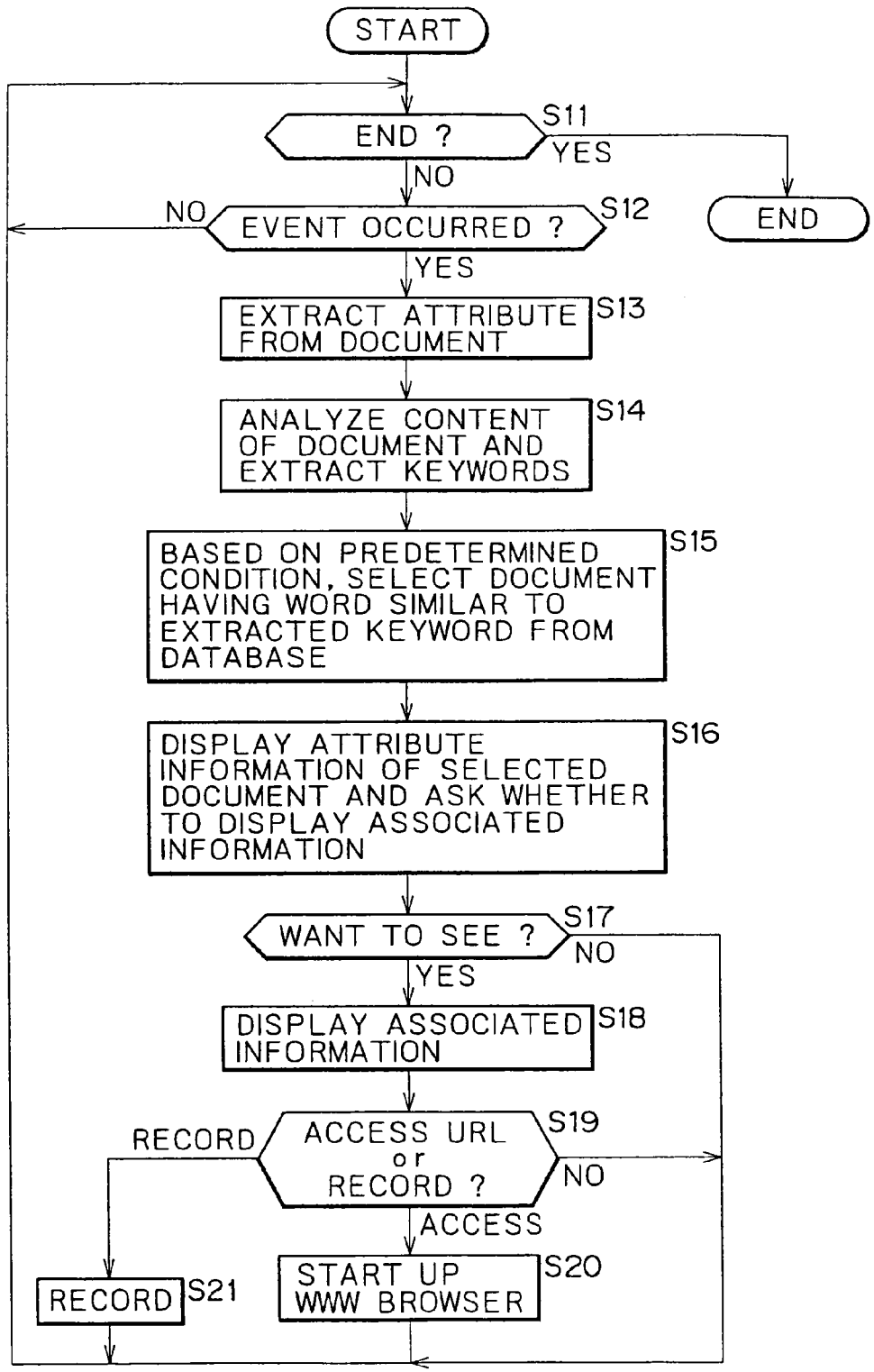
FIG. 5 is a flowchart for describing associated information presentation processing of the agent program.

The following describes the associated information presentation processing by the agent program with reference to the flowchart shown in FIG. 5. Unlike the above-mentioned database preparation processing, this associated information presentation processing is repeatedly executed while the agent program is executed.

In step S11, it is determined whether the end of the agent program has been indicated or not. If the end of the agent program is found not indicated, then the processing goes to step S12. In step S12, the event extraction block 8 monitors the occurrence of an event (such as the end of electronic mail transfer). If no event occurrence is detected, then the processing returns to step S11 to repeat the processes in this step and on. If an event occurrence is detected in step S12, then the processing goes to step S13.

In step S13, the event extraction block 8 informs the database inquiry block 9 of the event occurrence. In response to the information of the event occurrence from event extraction block 8, the database inquiry block 9 acquires the document (the transferred electronic mail) corresponding to the event occurrence and extracts the attribute information from this document. In step S14, the database inquiry block 9 extracts the keywords from this document.

In step S15, the database inquiry block 9 searches the database prepared by the document feature database preparation block 5 by use of the attribute information extracted in the processing of step S13 and the keywords extracted by the processing of step S14, extracting the matching attribute information. Further, the database inquiry block 9 selects the keywords which satisfy the following condition 1 and condition 2 from among the keywords extracted as the search results, by focusing attention to the time-dependent transition of the keyword weights.

Figure 6:
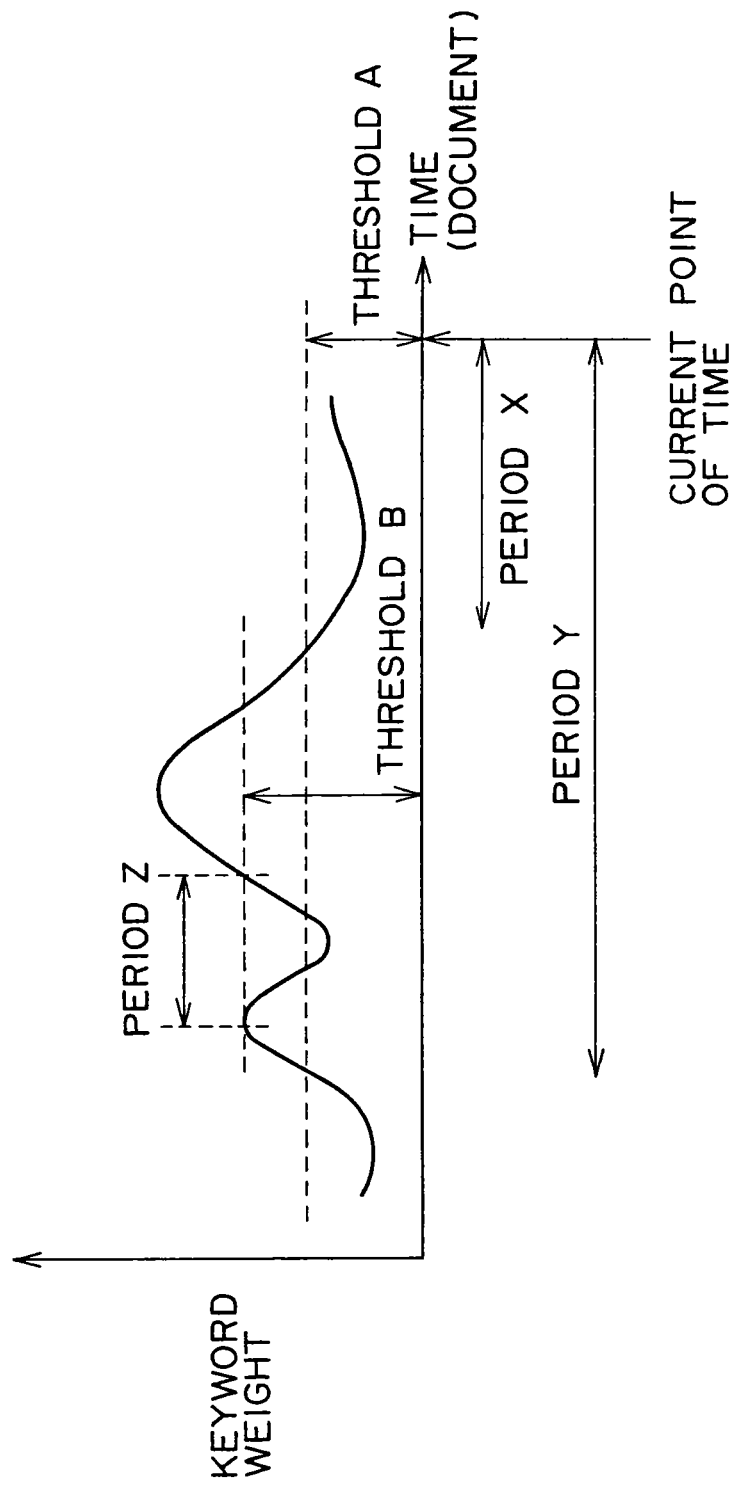
FIG. 6 is a diagram for describing a process of step S15 of FIG. 5.

The following describes the keyword selection conditions with reference to FIG. 6. FIG. 6 shows an example of a time-dependent transition of the weights of the keywords accumulated in the database. Condition 1 is "the keyword weight is less than predetermined value A during a predetermined period X before the current point of time (for example, 2 weeks)." Condition 2 is "the keyword weight is higher than a predetermined threshold B in 2 or more different documents during a predetermined period Y (for example, 5 weeks) before the current point of time." It is better to add condition 3 "the least recent document and the most recent document of the 2 or more documents of condition 2 are separated from each other more than predetermined period Z."

Use of these conditions allows the selection of the keywords which may be of interest to the user. Especially, because condition 1 excludes the keywords included in documents near the current point of time, a renewed selection of the associated information (too recent information) which the user may be aware of at the current point of time can be avoided. At the same time, this also excludes the keywords included in very earlier documents, so that a renewed selection of the associated information (too old information) which the user cannot remember at the current point of time can be avoided. Further, a transitory subject may be excluded.

The database inquiry block 9 supplies the associated information of the key words thus selected to the associated information presentation block 10 via the event extraction block 8.

Referring to FIG. 5 again, in step S16, the agent control block 11 displays, as the reason of the selection, the attribute information of the document containing the keyword selected in step S15 and displays an input window 61 (FIG. 17) on the desktop for asking the user for displaying the corresponding information.

It will be apparent that, instead of displaying the input window 61, the associated information may be directly displayed on the desktop.

In step S17, it is determined whether the user has selected the "See" button in response to the prompt of the input window 61 displayed in step S16. If the "See" buttons is found selected, the processing goes to step S18.

In step S18, the associated information presentation block 10 displays on the desktop the associated information supplied from the database inquiry block 9 via the event extraction block 8.

It should be noted that the information to be displayed as the associated information may be information other than Web page titles if the information is what stored in a predetermined database assigned with a keyword. For example, an index of the information accumulated in a predetermined database may be displayed, thereby further displaying the details of this index in response to an access command issued by the user.

In step S19, if the access command is found issued by the user for the title of the Web page displayed as the associated information in step S18, then the processing goes to step S20. In step S20, the WWW browser is started, accessing this Web page.

Figure 20:
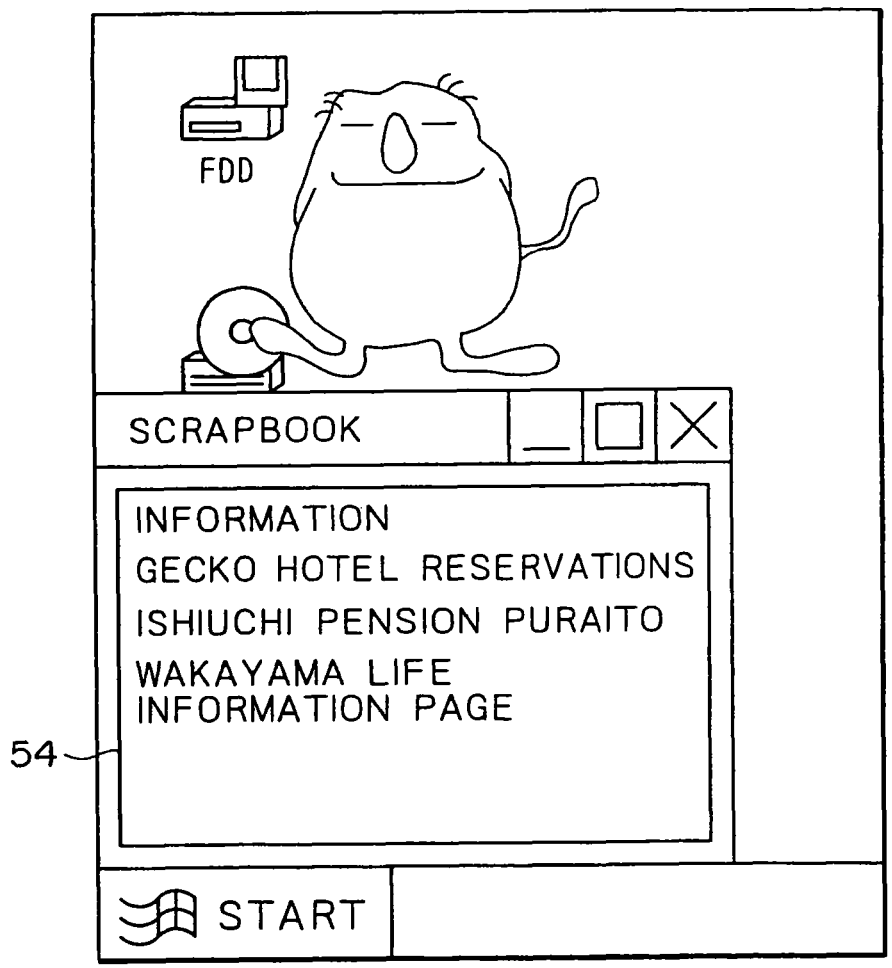
FIG. 20 is a display example of a scrapbook window 54 displayed on the desktop.

If, in step S19, the user command is found specifying to record the title of the Web page displayed in step S18 as the associated information, then processing goes to step S21. In step S21, the title and URL of this Web page are recorded in a scrapbook window 54 (FIG. 20). If, in step S19, no command by the user is found for the title of the Web page displayed as the associated information in step S18 and a predetermined time has passed, the process of the step S20 or step S21 is skipped and the processing returns to step S11.

If, the "See" button is found not selected by the user in step S17, then the processes of step S18 through step S21 are skipped and the processing returns to step S11.

The following describes a method of efficiently retrieving the electronic mails corresponding to event occurrences. First, attention is focused on that most mailers have the following four characteristics with respect to the form for holding mails. The first characteristic is that one folder in each mailer corresponds to one mail box file in each personal computer. The second characteristic is that newly received mails are stored in a particular folder and, in the personal computer, this folder is added to the end of a file corresponding this folder and, because one file generally contains plural mails, a particular character string pattern (depending on each mailer) is inserted between mails. The third characteristic is that the records of transmitted mails are also stored in a particular file in the same form as the above-mentioned folder. The fourth characteristic is that the size of the file contenting transferred mails is generally large (several hundred KB to 1 MB).

In consideration of the above-mentioned first through fourth characteristics, the mail corresponding to an event occurrence is obtained in accordance with a procedure. First, the update date of the mail box file is checked to see if a new mail has been added or not. Next, the mail box file added with the new mail is shifted by one line from the end to the start, thereby detecting a particular character string indicative of the boundary between mails. If the character string indicative of the boundary is detected, the data from this position to the end of the mail box file are extracted.

Use of the above-mentioned method allows the efficient acquisition of the electronic mail corresponding to event occurrences.

The following describes a method of preventing associated information from being presented for a same mail in the associated information presentation processing. First, a data structure for recording the message ID of a mail for which the associated information has been presented is set. Next, if an event occurs, the message ID of the mail corresponding to that event is acquired and the acquired message ID is compared with the data structure set above. If the same message ID is found in this data structure, it indicates that the association information has been already presented for that mail, so that the associated information is not displayed any more. If the same message ID is not found in this data structure, it indicates that the associated information has not yet been presented to that mail, so that the associated information is displayed and the message ID is recorded in this data structure.

The above-mentioned method can prevent a situation from being caused in which the associated information is repeatedly presented to the same mail.

Figure 7:
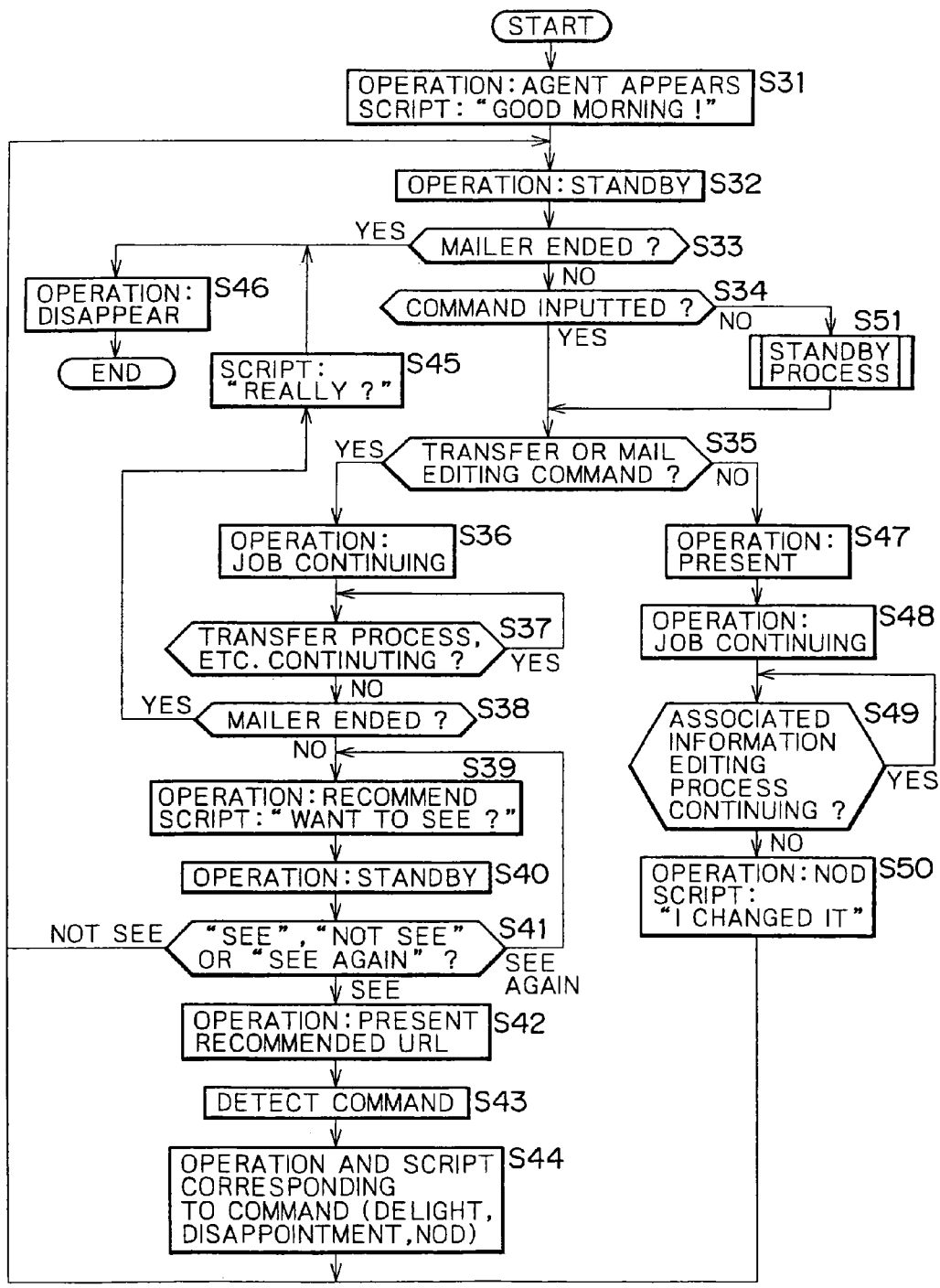
FIG. 7 is a flowchart for describing actions for example of an agent.
Figure 8:
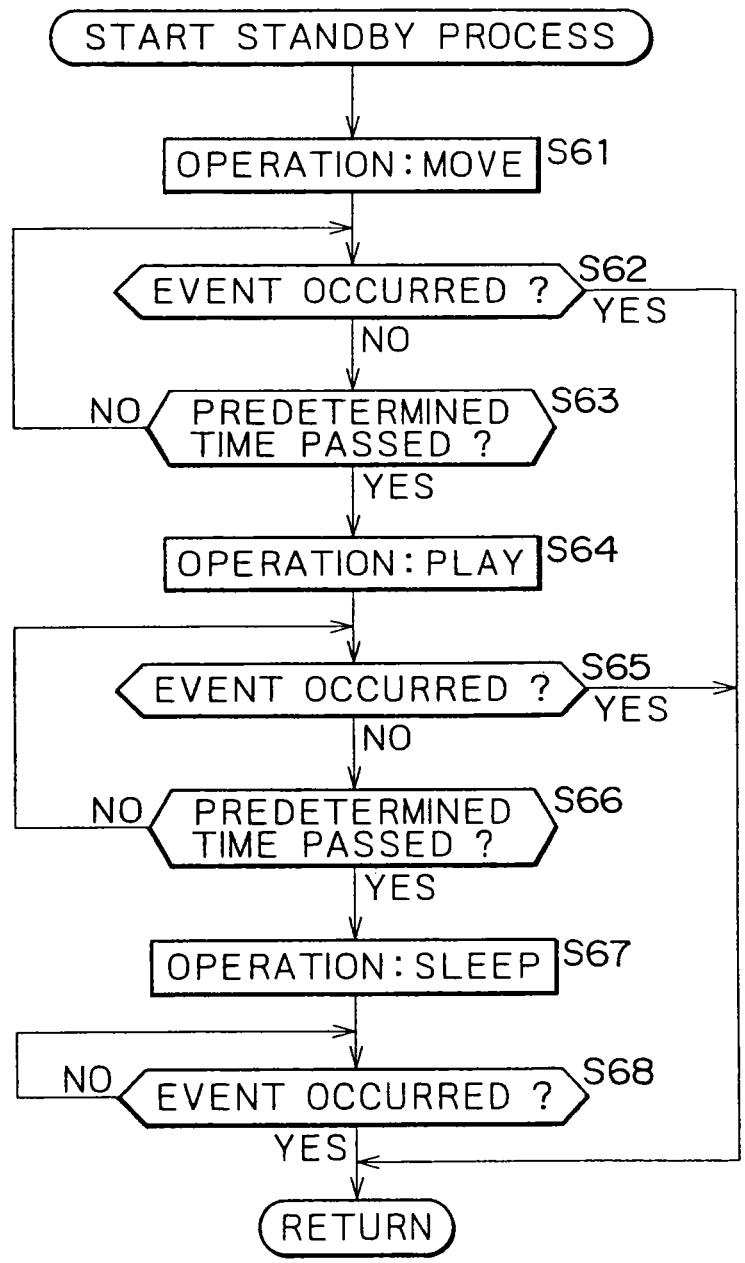
FIG. 8 is a flowchart for describing details of a standby process of step S51 of FIG. 7.

The following describes the operation and scripts of an agent associated with the processing of step S17 through step S21 of the associated information presentation processing, with reference to the flowcharts shown in FIGS. 7 and 8. It should be noted that, of the processes to be executed in these steps, the operation and script of the agent are executed mainly by the agent control block 11 among the functional blocks.

Figure 11:
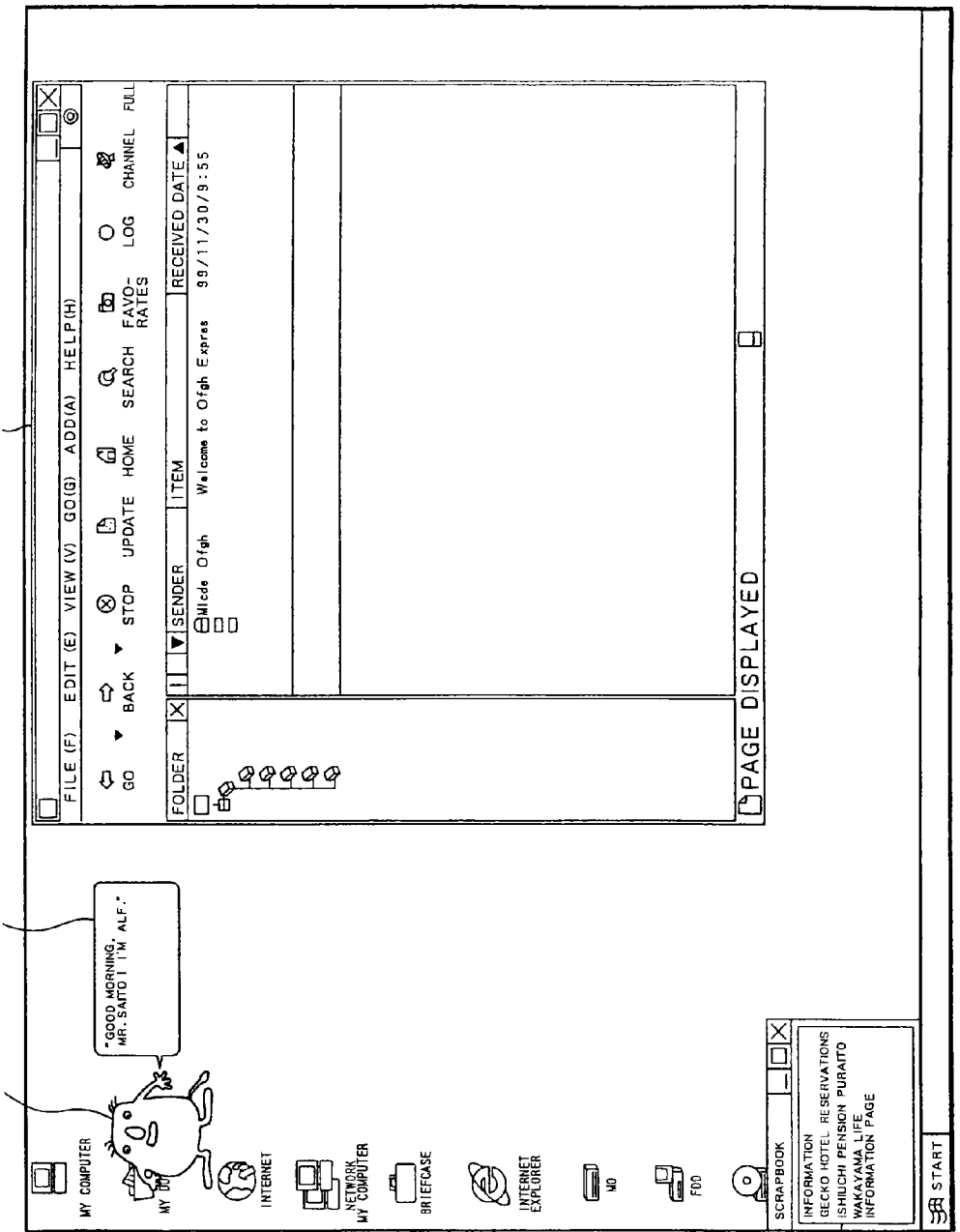
FIG. 11 shows a display example of an agent 52 displayed on the desktop.
Figure 12A:
FIGS. 12A to 12D are display examples in which the agent 52 appears on the desktop.
Figure 12B:
Figure 12C:
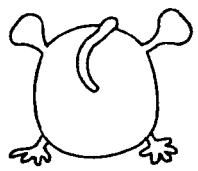
Figure 12D:

For example, when the mailer is started with the agent program already started, an agent 52 appears (is displayed) at a location not overlapping with the display of a window 51 of the mailer (hereafter referred to as a mailer window 51) in step S31 as shown in FIG. 11.

The appearance of the agent 52 is represented by a moving image in which the agent rolls forward onto the desktop by sequentially displaying the images shown in FIG. 12A through FIG. 12D. Shown along with the appearance of the agent 52 are a balloon 53 for shown a script of the agent 52 and a scrapbook window 54 (to be described later) in which a list of stored associated information is shown. In the balloon 53, as shown in FIG. 13, script lines such as a appearance greeting "Good morning, Mr. Saito!" and a self introduction "I'm Alf" for example.

In synchronization with the displaying of the balloon 53, a voice signal generated by a voice synthesizer (not shown) is outputted, representing the Japanese rendition of the above-mentioned script lines "Good morning, Mr. Saito!" and a self introduction "I'm Alf" shown in the balloon 53. Obviously, the voice signal may be of the same language as that in which the script lines shown in the balloon 53 are spoken, namely English. It should be noted that the balloon 53 to be displayed hereafter is also accompanied by the corresponding voice signals. Further, the voice signal may not necessarily be accompanied.

Next, in step S32, the display of the agent 52 undergoes a transition to a moving image which represents a demeanor of standby (the arms on the back and moving tiptoes up and down) as shown in FIG. 14.

In step S33, it is determined whether the mailer has ended or not. If the mailer is found not ended, the processing goes to step S34. In step S34 (which corresponds to step S12 of FIG. 5), it is determined whether a command (for mail transfer, mail editing, or associated information editing) has been inputted by the user to the mailer. If a command is found inputted, the processing goes to step S35. The mailer starts the process corresponding to the inputted command.

In step S35, the inputted demand is checked. If the command is found to be a mail send command, a mail receive command, or an edit command, the processing goes to step S36.

In step S36, the display of the agent 52 undergoes a transition from the standby demeanor to a moving image indicative of doing a job (by quickly moving its hands and feet) as shown in FIG. 15. Meanwhile, the processes of step S13 through step S15 (the processing for selecting the associated information to be recommended to the user) in FIG. 5 are executed.

In step S37, it is determined whether the processing (for example, mail sending) of the mailer started in response to the inputting of the command is continuing or not and the system is put in a standby state until the mailer job is ended. During this standby state, the displaying of the agent 52 is that of doing the job. If the mailer process is found not continuing, namely if the mailer process started in response to the inputting of the command is found ended, the processing goes to step S38.

In step S38, it is determined again whether the mailer has ended or not. If the mailer is found not ended, the processing goes to step S39.

In step S39 (which corresponds to step S16 of FIG. 5), the balloon 53 of the agent 52 shows, if the last mailer process is for mail sending, "You have just sent a mail to Mr. A. On XX day/XX month, you talked about (a title) with Mr. A, aren't you? I have found a page associated with (a keyword) in that title. Do you want to see?" for example.

If the last mailer process is for mail reception for example, the first half the above-mentioned script line becomes "You have just received a mail from Mr. A". If the last mailer process is for mail editing, the first half of the above-mentioned script line becomes "You are now writing a mail to Mr. A", for example.

The portion "On XX day/XX month, you talked about (a title) with Mr. A" corresponds to the reason why this associated information was selected. The reason of the selection may be displayed after the process of step S42 to be described later instead of displaying the reason in step S39. Also, the reason of the selection may be displayed at a user-specified time.

Figure 16:
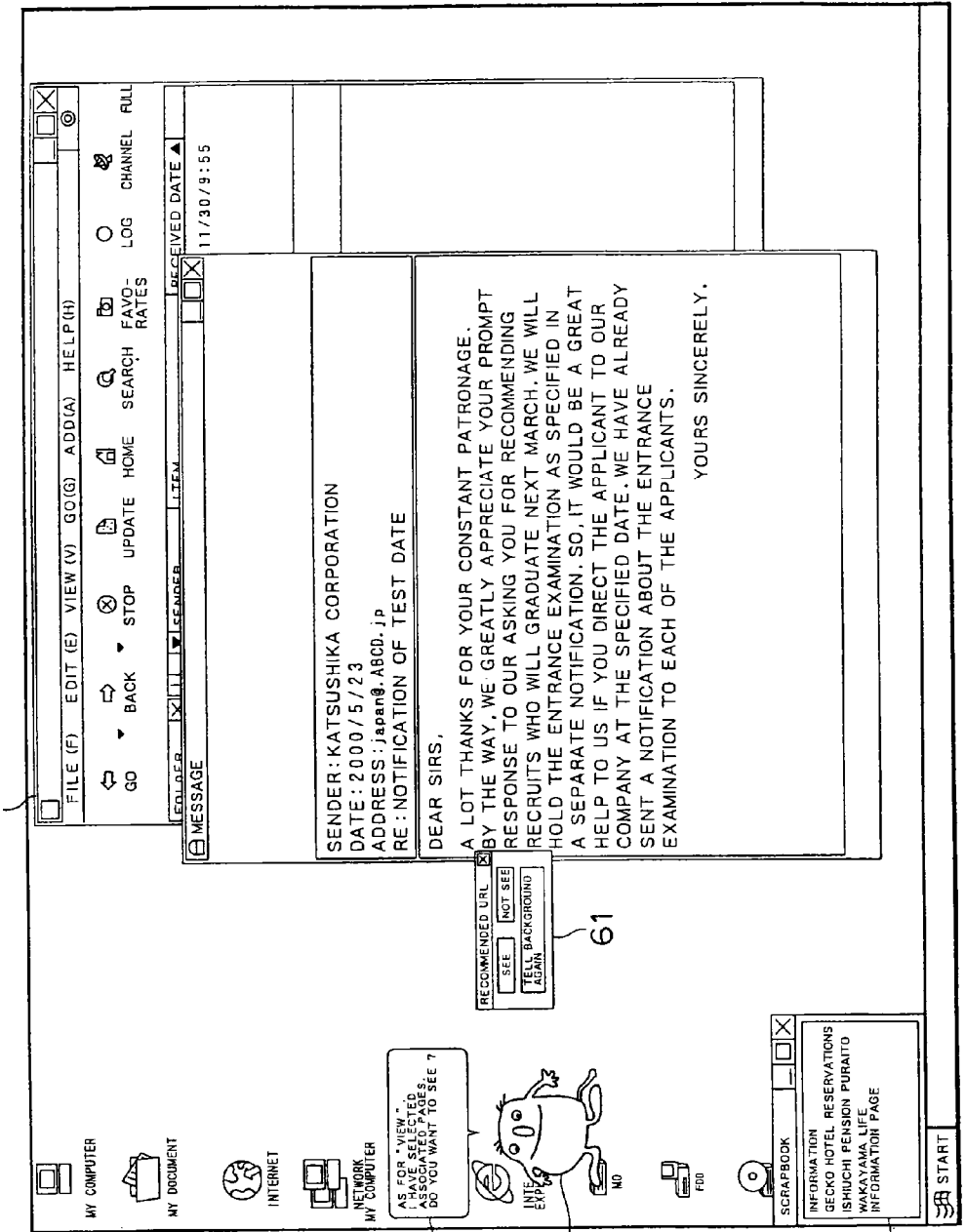
FIG. 16 is a display example of an input window 61 displayed on the desktop.
Figure 17:
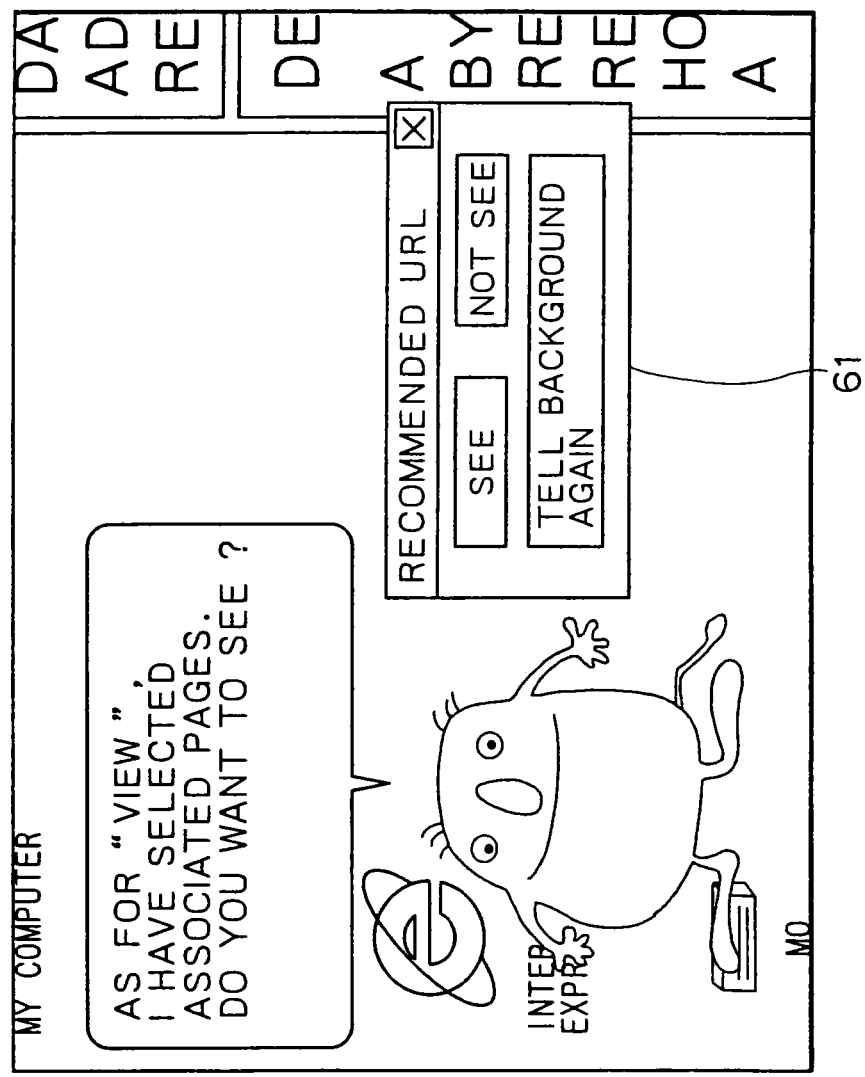
FIG. 17 is a display example of the input window 61.

At a position besides the balloon 53, the input window 61 is displayed as shown in FIG. 16. As shown in FIG. 17, the input window 61 shows "See" button which is selected when the user specifies the displaying of the associated information, "Not See" button which is selected when the user does not specify the display of the associated information, and "Tell me the background again" button which is selected when the user specifies the re-displaying of the background (the selection reason) on which the associated information was selected.

In step S40, with the input window 61 displayed, the display of the agent 52 undergoes a transition to the moving image indicative of the demeanor of standby shown in FIG. 14. In step S41 (which corresponds to step S17 of FIG. 5), it is determined which of the buttons "See", "Not See", and "Tell me the background again" has been selected by the user. If the "See" button has been selected, the processing goes to step S42.

Figure 18:
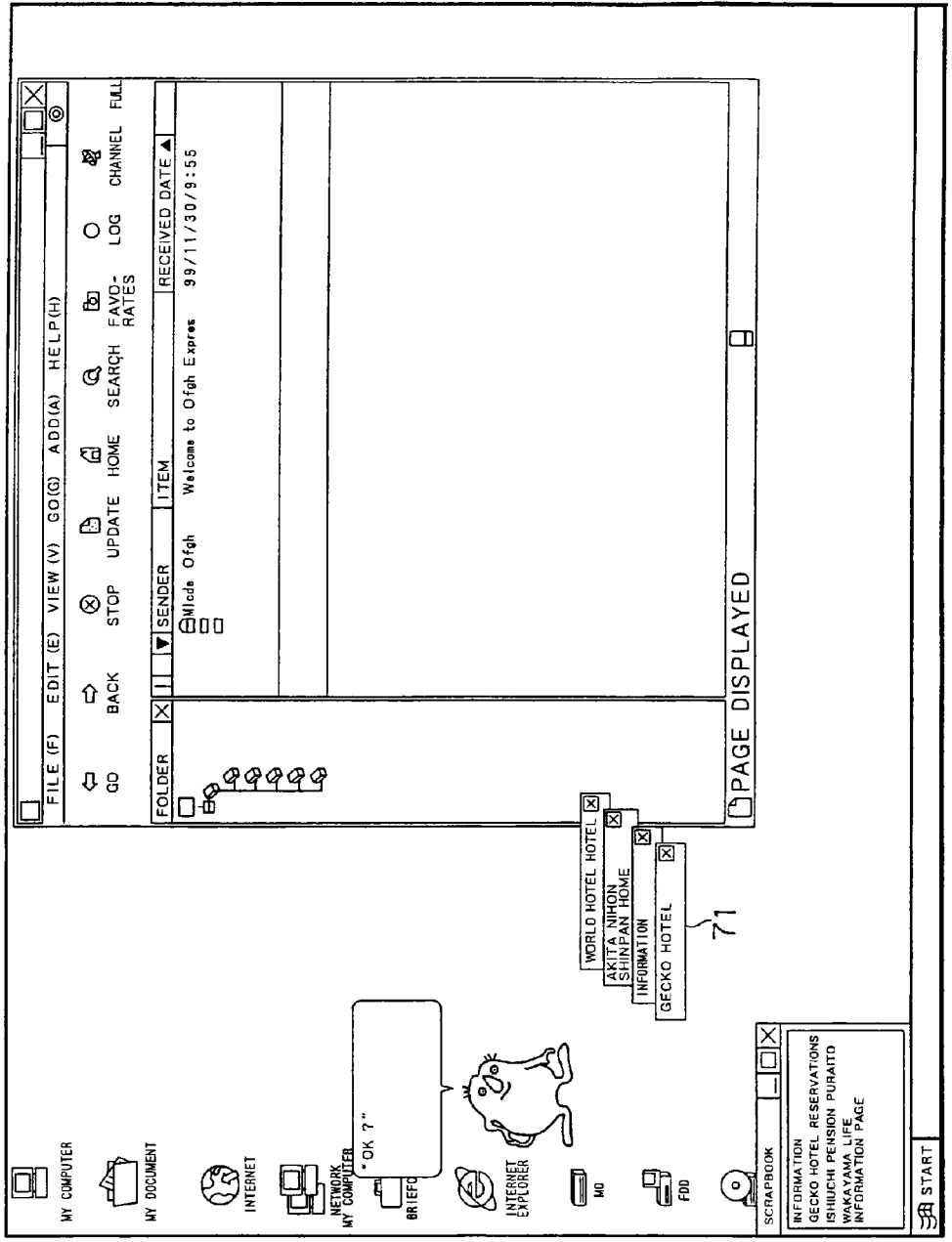
FIG. 18 is a display example of a recommended URL 71 displayed on the desktop.
Figure 19:
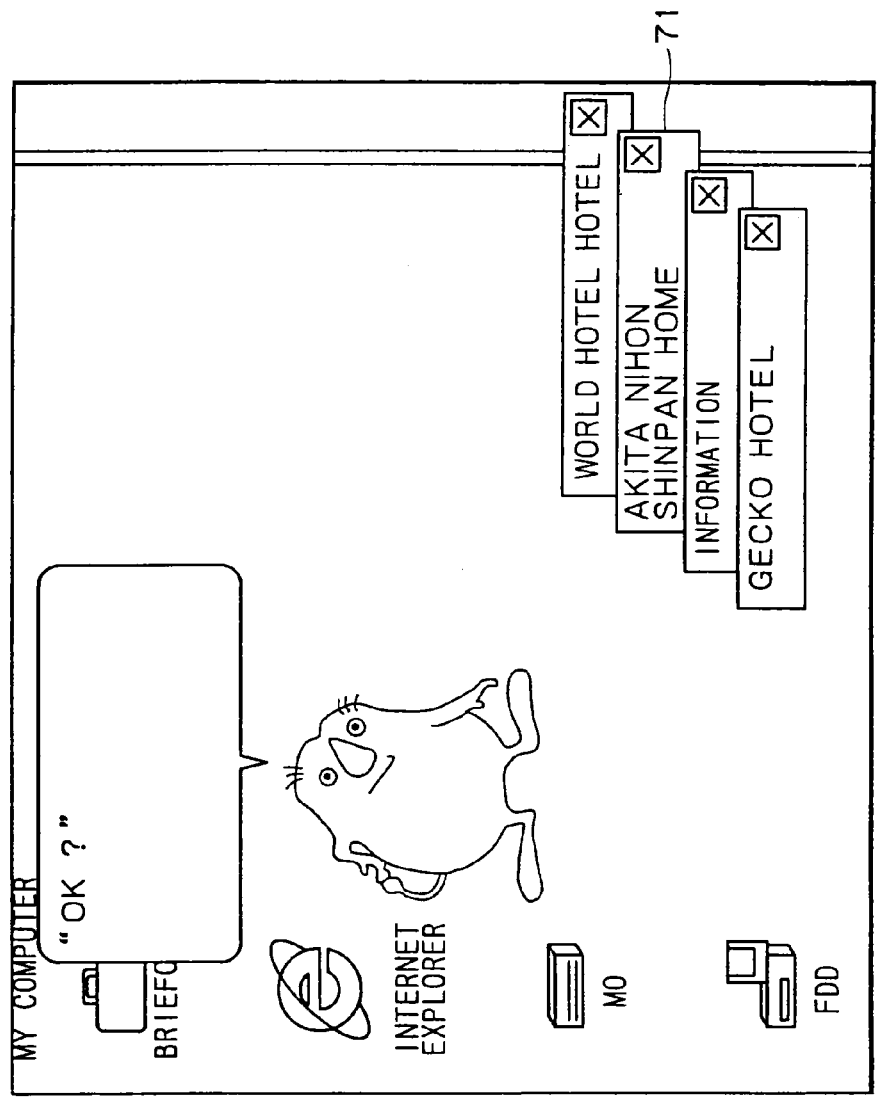
FIG. 19 is a display example in which the agent 52 is asking a question.

In step S42 (which corresponds to step S18 of FIG. 5), a recommended URL 71 is displayed as the associated information as shown in FIGS. 18 and 19, upon which the display of the agent 52 undergoes a transition to a moving image pointing at the displayed recommended URL 71. In the balloon 53, script "OK?" is shown. The recommended URL 71 normally shows the title of a Web page to be recommended. Only when the mouse cursor is positioned to the recommended URL 71, the URL is also shown in a superimposed manner. The recommended URL 71 may be dragged to any desired position by the mouse.

In step S43 (which corresponds to step S19 of FIG. 5), the user command for the displayed recommended URL 71 is detected. There are record, access, and delete commands for example for the recommended URL 71 which may be in plural.

The record command for the recommended URL 71 is for dragging the recommended URL 71 to be recorded to the scrapbook window 54 and dropping the recommended URL 71 there may be for selecting the record item from a menu displayed by clicking the right button of the mouse. Likewise, the access command and the delete command may be for dragging the recommended URL to an icon or a trash box of the WWW browser and dropping it there, for selecting an item from a menu displayed by clicking the right button of the mouse, or for making the recommended URL clickable.

If the record command for the recommended URL 71 is selected in step S43, then, in step S44 (which corresponds to step S21 of FIG. 5), the display of the agent 52 undergoes a transition to a nodding action as shown in FIG. 18. In the scrapbook window 54, the title of the Web page corresponding to the recommended URL 71 to be recorded is added.

Figure 21A:
FIGS. 21A and 21B are display examples in which the agent 52 is delighted.
Figure 21B:
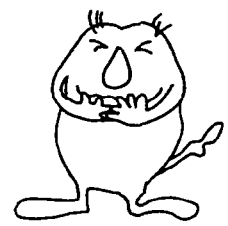

If the access command for the recommended URL 71 is detected in step S43, then, as shown in FIG. 21A and FIG. 21B, the display of the agent 52 undergoes a transition to a delighted demeanor with a smiling face. At this moment, the balloon 53 displays "Waao!" and a corresponding voice signal is outputted.

Figure 22A:
FIGS. 22A and 22B are display examples in which the agent 52 is depressed.
Figure 22B:

If the delete command for the recommended URL 71 is detected in step S43, then, in step S44, the display of the agent 52 undergoes a transition to a disappointed demeanor with a face of tears as shown in FIGS. 22A and 22B. The balloon 53 displays "Oh! No . . . " and a corresponding voice signal is outputted.

When the process of step S44 has been completed, the processing returns to step S32 to repeats the processes of this and subsequent steps.

If, in step S41, the "Not See" button in the input window 61 is selected, then the processing returns to step S32 to repeat the processes of this and subsequent steps. If, in step S41, "Tell me the background again" button in the input window 61 is selected, the processing returns to step S39 to repeat the processes of step S39 through step S41.

If the mailer is found ended in step S38, the processing goes to step S45. In step S45, the balloon 53 displays "Really?" and a corresponding voice signal is outputted. In step S46, the display of the agent 52 is disappears (which will be described later with reference to FIGS. 27A and 27B).

If, in step S35, the command for specifying the editing of the associated information is found inputted, the processing goes to step S47. In step S47, an associated information editing window (not shown) is displayed and the display of the agent 52 undergoes a transition from the standby demeanor to a demeanor which points at the associated information editing window as with FIG. 19. Then, when the user starts an input operation for editing into the associated information editing window, the display of the agent 52, in step S48, undergoes a transition from the pointing at the associated information editing window to a moving image indicative that the jog is going on shown in FIG. 15.

In step S49, it is determined whether the associated information editing process is continuing or not and the system waits until the associated information editing process comes to an end. During this wait state, the display of the agent 52 is that the job is continuing; not the associated information editing process is continuing. Namely, the associated information editing process is found terminated and the processing goes to step S50.

In step S50, the display of the agent 52 undergoes a transition to a nodding demeanor as with FIG. 20. The balloon 53 displays "Changed." and a corresponding voice signal is outputted. Then, the processing returns to step S32 to repeat the process of this and subsequent steps.

If the no command has been inputted by the user for the mailer for more than a predetermined time in step S34, the processing goes to step S51. In step S51, the display of the agent 52 sequentially undergoes transitions to a moving state, a playing state, and sleeping state every time a predetermined time passes. The following describes the details of the process to be executed in this wait state with reference to the flowchart of FIG. 8.

In step S61, the display of the agent 52 undergoes a transition from the wait state shown in FIG. 14 to a moving state represented by use of an image shown in FIGS. 23A to 23D or 24A to 24F.

The moving of the agent 52 is made horizontally or vertically on the desktop such that the agent does not overlap a displayed window. If required, an active window (in this case, the mailer window 51) may be detected and the agent may be horizontally or vertically moved around the detected active window. When the agent 52 moves in the horizontal direction (for example, to the right) of the desktop, the agent is displayed in a moving image effect of so-called warping, by sequentially using the images shown in FIG. 23A through FIG. 23D for example. Specifically, in the display of the agent 52, the body is directed in the moving direction at the starting point of the moving as shown in FIG. 23A. Then, when the agent jumps, the agent disappears starting with the head as shown in FIG. 23B. At the end point of the moving, the agent appears starting from the feet as shown in FIG. 23C, finally fully appearing as shown in FIG. 23D.

Figure 24A:
FIGS. 24A to 24G are display examples in which the agent 52 moves vertically.
Figure 24B:
Figure 24C:
Figure 24D:
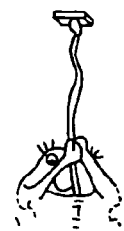
Figure 24E:
Figure 24F:
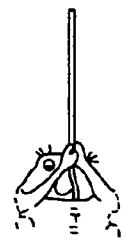
Figure 24G:

When the agent 52 moves up and down on the desktop, the images shown in FIGS. 24A through 24G for example are sequentially used. Namely, at the starting point of movement, the agent 52 grasps its tail (which ends in the shape of an outlet plug) as shown in FIG. 24A and plugs the tail into a socket overhead as shown in FIG. 24B. Then, the agent 52 gradually transforms, starting with its bottom, into a rope as shown in FIGS. 24C and 24D, finally becoming one rope as shown in FIG. 24E to the end point of the movement. At the end point of the movement, the agent gradually restores its shape starting with the head to its full body as shown in FIGS. 24F and 24G.

Thus, the amount of the resources (such as the memory) for use in representing the shapes of the agent during its movement can be reduced by representing the agent in a warped manner and transforming into a rope for example.

Referring to FIG. 8 again, in step S62, it is determined whether an event (the inputting of a command for specifying mail transfer, mail editing, or editing of the associated information) has taken place or not. If no event is found taking place, the processing goes to step S63.

In step S63, it is determined whether a predetermined time has passed since the display of the agent 52 underwent a transition to the moving state. The processes of steps S62 and S63 are repeated until the predetermined time is found passed. If a predetermined time is found passed in step S63, the processing goes to step S64.

Figure 25A:
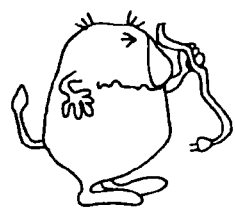
FIGS. 25A and 25B are display examples in which the agent 52 is playing.
Figure 25B:
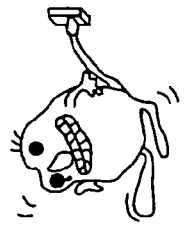

In step S64, the display of the agent 52 undergoes a transition from movement to a play state represented by an image shown in FIGS. 25A and 25B for example. FIG. 25A shows a state in which the agent 52 is playing with a snake. FIG. 25B shows a state in which the agent 52 plugs its tail into a socket overhead and is swingingly dangling from it.

In step S65, it is determined whether an event has occurred or not. If no event is found, the processing goes to step S66. In step S66, it is determined whether a predetermined time has passed since the display of the agent 52 has undergone a transition of the play state. The processes of steps S65 and S66 are repeated until it is determined that the predetermined time has passed. If the predetermined time is found passed in step S66, the processing goes to step S67.

Figure 26:
FIG. 26 is a display example in which the agent 52 is sleeping.

In step S67, the display of the agent 52 undergoes a transition from the play state to a sleeping state represented by an image shown in FIG. 26 for example. In step S68, it is determined whether an event has occurred or not. The processing waits until the occurrence of an event is detected. If an event is found in step S68, the processing returns to step S35 of FIG. 7 to repeat the processes of this and subsequent steps.

If an event is found in step S62 or step S65, the processing also returns to step S35 of FIG. 7 to repeat the processes of this and subsequent steps.

Although not shown in the flowchart of FIG. 8, if, during the execution of the standby process, the mailer is found ended, the processing returns to step S46. Likewise, if the mailer is found ended in step S33 of FIG. 7, the processing goes to step S46.

Figure 27A:
FIGS. 27A and 27B are display examples in which the agent 52 is leaving away.
Figure 27B:

In step S46, the display of the agent 52 goes away showing its back and shaking its hand, getting smaller and smaller, finally disappearing in the background, by use of the images shown in FIGS. 27A and 27B for example.

At the same time the agent 52 disappears, the balloon 53, the scrapbook window 54, and the recommended URL 71 or the like disappear.

Thus, according to the present invention, the agent acts in response to a series of processes of extracting keywords from a document such as an electronic mail and recommending the associated information, so that the user comes to feel a reliability with the agent 52.

Meanwhile, the displaying of the actions of the agent and the script lines in the balloon and the outputting of the voice signals corresponding to the displayed script lines may be applied to applications other than the agent program of this invention, for example, the help screens of game and word-processor software. In addition, these displaying and outputting capabilities can be applied to the characters which are displayed on television receivers, video cameras, and automobile navigation devices.

In an environment in which two or more users operate one personal computer, the agent may be prepared in two or more types in correspondence to the users. Moreover, if one user uses the agent program on two or more personal computers, the same agent may be displayed on all of them.

The following describes the timings of preparing and updating databases by the accumulation block 1. Each database is prepared as described above with reference to the flowchart of FIG. 3. If the following first through the third conditions are encountered, the database concerned must be updated.

The first condition: the database must be updated because the associated information in the database becomes obsolete when a predetermined time has passed since the preparation or the last update of the database. The second condition: the database must be updated because, if a predetermined portion of the associated information accumulated in the database has already been presented, the repetitive presentation of the associated information occurs or the associated information to be presented runs short. The third condition: the database must be updated because, if a document used for feature extraction is an electronic mail for example, the repetitive transfer of the electronic mail changes the contents of the document.

If a situation occurs in which the database must be updated, the user may be prompted for the update or, instead of prompting, the automatic update may be set. It is also practicable to update the database at user-specified time intervals.

Figure 9:
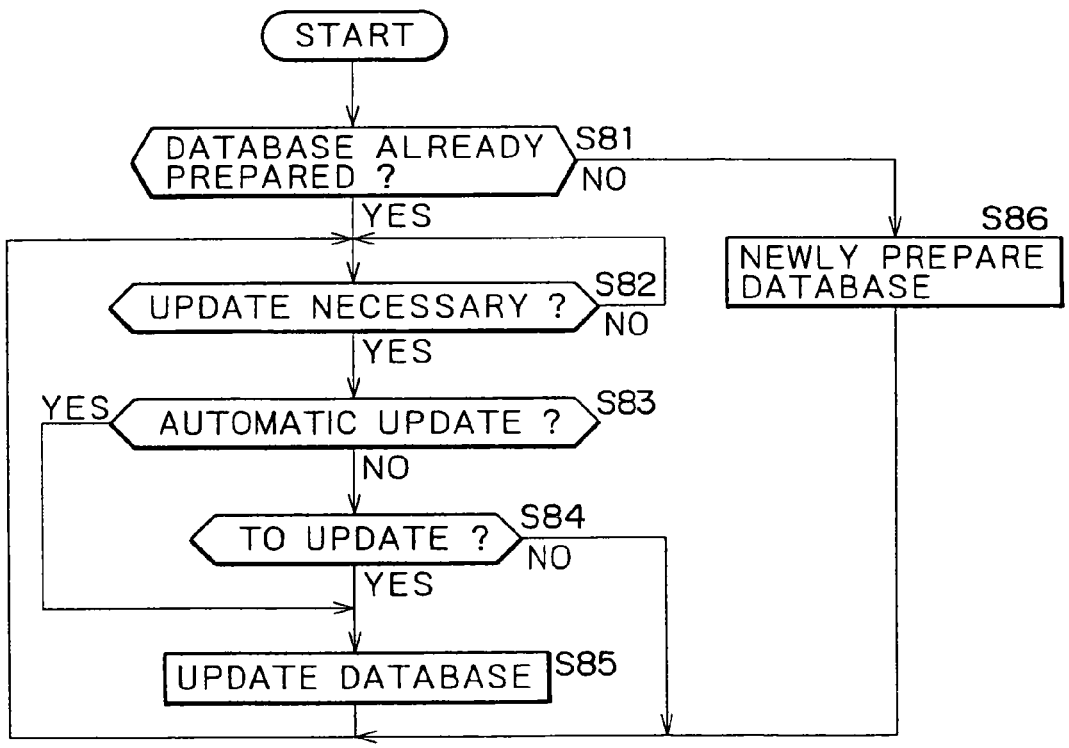
FIG. 9 is a flowchart for describing database update processing of the agent program.

The following describes a database update process with the above-mentioned first through third conditions taken into account with reference to the flowchart of FIG. 9. This database update process is one of the processes to be executed by the agent program and starts when the agent program starts, being repetitively executed until the agent program is ended.

In step S81, it is determined whether a database has already been prepared. If a database is found prepared, the processing goes to step S82. If the database is found not yet prepared, the processing goes to step S86 (which corresponds to the database preparation process shown in FIG. 3).

In step S82, it is determined whether the prepared database must be updated or not and the processing waits until the database is found to be updated. The criteria for the update is set by the user in advance by use of a user interface screen as shown in FIG. 10 for example. In the example of FIG. 10, four conditions are shown, in which, when the white box at the left end of each condition is checked by the user, that condition is made valid. With the first condition, the execution count can be set. With the third condition, the number of elapsed days can be set.

In step S82, if the update is found necessary, the processing goes to step S83. In step S83, it is determined whether the automatic update is set or not. If the automatic update is found not set, the processing goes to step S84. On the other hand, if the automatic update is found set in step S83, step S84 is skipped.

In step S84, a notification that the database must be updated is sent to the user and it is determined whether the user has issued a command for the updating operation in response to this notification. If the user command is found issued, the processing goes to step S85. On the other hand, if no command for the update is found in step S84, the processing returns to step S82 to repeat the processes of this and subsequent steps.

In step S85, the prepared database is updated. To be specific, newly added documents or document whose contents were changed are selected, features are extracted from the selected documents, the extracted features are accumulated, and the associated information is retrieved by use of the accumulated features.

To be more specific, an electronic mail box file (for example, a file often attached with an extension mbx) is detected by the document capture block 2 through the document content processing block 4, the date of the update is obtained, and the obtained date is compared with the last update date. If a mismatch is found, the file is determined updated and the added or changed portion is extracted. In this case, a series of analyses in file such as mail grouping, header analysis, morphemic analysis, and feature vector extraction are executed and the resultant search keywords are supplied to the associated information retrieval block 6.

If there is no change in mail group and, as a result of these analyses, there is a match between the search keyword before update and the search keyword after update, only the computed values such as weight may be changed, without having the associated information retrieval block 6 execute associated information retrieval. If the search for the associated information is executed on a network such as the Internet, it is determined whether the system is connected to the network. If the system is not connected to the network, the search for the associated information is not executed. Thereafter, the user may be asked whether to search for the associated information upon connection to the network.

With respect to a condition "in order to prevent the same associated information from being repetitively presented (recommended), it is determined that the associated information of a certain group must be updated when the associated information has been recommended by more than a predetermined number of times," the following process is executed when selecting a mail group which is high in similarity with the obtained mail, thereby preventing the repetitive recommendation from the same mail group.

The mail group themselves are prioritized for recommendation (for example, the maximum value of the weights of the feature words in each mail group is used as the priority of that mail group and the mail groups are arranged in the descending order of the priority) and each mail group, once recommended, must be arranged at the end of the mail groups. Consequently, in the mail groups within a range of similarity, the frequency of recommendation from a same mail group is decreased. In addition, the above arrange can be realized only by changing priorities, retrieving and storing a lot of associated information in advance can decrease the number of times recommendation is made from same mail groups and prevent the information itself from being running short. Further, the same operation may be applied not only to the mail groups but to a document arbitrarily grouped.

With respect to this point, a range of extracting similar documents may be changed in accordance with the amount of a document to be used for feature extraction. To be specific, the ranges having several levels of similarity are set in accordance with the amount or data size of documents from which features are extracted. For example, if the document amount is less than 10 files, the similarity is 0.01 or higher. If the document amount is 11 files or more and less than 50 files, the similarity is 0.03 or higher. If the document amount is 51 files or more, the similarity is 0.05 or higher. If the document size is less than 500 Kb, the similarity is 0.01 or higher. If the document size is 500 Kb or higher, the similarity is 0.02 or higher.

Of the documents in a previously set range, the associated information retrieved from a document of higher priority is presented earlier. This arrangement prevents the associated information from running short due to the similarity range narrowed too much by the reduction in document amount to change the similarity range caused by the updating of database contents. At the same time, this arrangement prevents the associated information not clear in relationship to the user because of too wide a similarity range from being presented.

As described, in the database updating process, only the added or changed documents are processed, so that the processing time is shortened as compared with the repetitive execution of the database preparation process.

It should be noted that, in addition to the documents transferred by the mailer and the documents edited by word processors for example, the agent program according to the present invention is also applicable to such documents having time stamps for attribute information as chat, electronic news, and electronic bulletin board documents and documents obtained by converting voice signals into text.

The following describes a program storage medium according to the present invention. The above-mentioned series of processing operations may be executed by hardware; normally, however, they are executed by software. This software is executed by a computer in which the programs constituting the software are installed in a dedicated hardware device beforehand or by a general-purpose personal computer capable of executing various capabilities in which these programs are installed from the program storage medium.

As shown in FIG. 2, the program storage medium for storing computer-readable and executable programs may be a package medium constituted by the magnetic disc 32 (including floppy disc), the optical disc 33 (including CD-ROM and DVD), the magneto-optical disc 34 (including MD), or the semiconductor memory 35, the ROM 22 on which the programs are stored temporarily or permanently, or a hard disc constituting the storage block 29, not shown. Programs are stored in the program storage medium from wired or wireless communications media such as a local area network, the Internet, and digital satellite broadcasting via the interface constituted by a router or modem as required.

It should be noted that the steps describing the programs to be stored in the program storage medium are not only executed in a time-dependent manner in the order described, but also in parallel or in a discrete manner.

As mentioned above and according to the first information processing apparatus and method and the programs in the first program storage medium associated with the invention, important words are selected from existing text files and the associated information related to the selected important words is obtained to construct a database. In addition, a keyword is detected from a text file corresponding to the occurrence of an event and the associated information corresponding to the detected keyword is retrieved. Consequently, the database can be automatically constructed and the associated information for the documents to be transferred can be presented to the user.

As mentioned above and according to the second information processing apparatus and method and the programs in the second program storage medium associated with the invention, a predetermined process of a predetermined application program is detected as an event, a character is displayed on the desktop in correspondence with the detected event, and the display of the character is changed in accordance with inputted commands. Consequently, a desktop mascot can be expressed which acts in accordance with application programs for processing text files in addition to mailers.

While a preferred embodiment of the present invention has been described using specific terms, such description is for illustrative purposes only, and it is to be understood that changes and variations may be made without departing from the spirit or scope of the following claims.

The invention claimed is:

1. An information processing apparatus, comprising:
a processing circuit configured to
detect receipt of electronic mail from a client terminal,
extract a keyword from the received electronic mail,
perform a search using the extracted keyword to retrieve associated information,
provide, to the client terminal via an animated agent, a query inquiring whether the retrieved associated information should be output, the query including reason information that includes a statement indicating why the associated information was retrieved, prior to outputting the retrieved information, and
control output of the associated information via the animated agent using at least one of text, image data, and audio, when receiving an indication that the retrieved associated information should be output.

2. The information processing apparatus of claim 1, wherein the processing circuit is further configured to extract the keyword from a plurality of keywords in the received electronic mail based on a time-dependent transition.

3. The information processing apparatus of claim 1, wherein the processing circuit is further configured to extract the keyword from a plurality of keywords when both a corresponding keyword weight of the keyword was less than a first predetermined threshold at any time during a first predetermined time period prior to a time of the extraction, and the corresponding keyword weight was also greater than a second predetermined threshold at any time during a second predetermined time period, longer than the first predetermined time period, prior to the time of the extraction.

4. The information processing apparatus of claim 1, further comprising a display configured to display the associated information and the reason information indicating why the associated information was retrieved.

5. The information processing apparatus of claim 1, wherein the processing circuit is further configured to extract attribute information from the received electronic mail, and search a database using the extracted attribute information and the extracted keyword.

6. The information processing apparatus of claim 1, wherein the processing circuit is further configured to acquire a title and a Uniform Resource Locator (URL) of a Web page containing the keyword as the associated information.

7. An information processing method, comprising:
detecting receipt of electronic mail from a client terminal;
extracting a keyword from the received electronic mail;
performing a search using the extracted keyword to retrieve associated information;
providing, to the client terminal via an animated agent, a query inquiring whether the retrieved associated information should be output, the query including reason information that includes a statement indicating why the associated information was retrieved, prior to outputting the retrieved information; and
controlling output of the associated information via the animated agent using at least one of text, image data, and audio, when receiving an indication that the retrieved associated information should be output.

8. The information processing method of claim 7, wherein the extracting step comprises extracting the keyword from a plurality of keywords in the received electronic mail based on a time-dependent transition.

9. The information processing method of claim 7, wherein the extracting step further comprises extracting the keyword from a plurality of keywords when both a corresponding keyword weight of the keyword was less than a first predetermined threshold at any time during a first predetermined time period prior to a time of the extraction, and the corresponding keyword weight was also greater than a second predetermined threshold at any time during a second predetermined time period, longer than the first predetermined time period, prior to the time of the extraction.

10. The information processing method of claim 7, wherein the displaying step further comprises displaying the associated information and the reason information indicating why the associated information was retrieved.

11. The information processing method of claim 7, wherein the extracting step further comprises extracting attribute information from the received electronic mail; and
the searching step further comprises searching a database using the extracted attribute information and the extracted keyword.

12. The information processing method of claim 7, wherein the searching step further comprises acquiring a title and a Uniform Resource Locator (URL) of a Web page containing the keyword as the associated information.

13. A non-transitory computer-readable medium storing a program that, when executed by a computer, causes the computer to perform an information processing method, comprising:
detecting receipt of electronic mail from a client terminal;
extracting a keyword from the received electronic mail;
performing a search using the extracted keyword to retrieve associated information;
providing, to the client terminal via an animated agent, a query inquiring whether the retrieved associated information should be output, the query including reason information that includes a statement indicating why the associated information was retrieved, prior to outputting the retrieved information; and
controlling output of the associated information via the animated agent using at least one of text, image data, and audio, when receiving an indication that the retrieved associated information should be output.

14. The computer-readable medium of claim 13, wherein the extracting step comprises extracting the keyword from a plurality of keywords in the received electronic mail based on a time-dependent transition.

15. The computer-readable medium of claim 13, wherein the extracting step further comprises extracting the keyword from a plurality of keywords when both a corresponding keyword weight of the keyword was less than a first predetermined threshold at any time during a first predetermined time period prior to a time of the extraction, and the corresponding keyword weight was also greater than a second predetermined threshold at any time during a second predetermined time period, longer than the first predetermined time period, prior to the time of the extraction.

16. The computer-readable medium of claim 13, wherein the displaying step further comprises displaying the associated information and the reason information indicating why the associated information was retrieved.

17. The computer-readable medium of claim 13, wherein the extracting step further comprises extracting attribute information from the received electronic mail; and
the searching step further comprises searching a database using the extracted attribute information and the extracted keyword.

18. The computer-readable medium of claim 13, wherein the searching step further comprises acquiring a title and a Uniform Resource Locator (URL) of a Web page containing the keyword as the associated information.

19. An information processing apparatus, comprising:
a processing circuit configured to
detect receipt of electronic mail from a client terminal,
extract a keyword from the received electronic mail, and
perform a search using the extracted keyword to retrieve associated information; and
a display configured to display the associated information,
wherein the processing circuit is further configured to extract the keyword from a plurality of keywords when a corresponding keyword weight of the extracted keyword is determined to be less than a predetermined threshold for an entire predetermined time period immediately prior to and including a time of extraction of the keyword.

20. A client terminal, comprising:
a processing circuit configured to
transmit an electronic mail to an information processing apparatus; and
receive, via an animated agent, a query inquiring whether information associated with a keyword extracted from the electronic mail transmitted to the information processing apparatus should be output, the query including reason information that includes a statement indicating why the associated information was retrieved, prior to outputting the retrieved information.

* * * * *

UNITED STATES PATENT AND TRADEMARK OFFICE
CERTIFICATE OF CORRECTION

PATENT NO. : 9,501,520 B2
APPLICATION NO. : 13/780517
DATED : November 22, 2016
INVENTOR(S) : Mari Saito et al.

It is certified that error appears in the above-identified patent and that said Letters Patent is hereby corrected as shown below:

On the Title Page

Item (63), the Related Application Data Information has been omitted, and Item (30), the Foreign Application Priority Data Information is incorrect. Items (63) and (30) should read:

--Related U.S. Application Data
(63) Continuation of application No. 09/785,204, filed on Feb. 20, 2001

(30) Foreign Application Priority Data
Feb. 21, 2000 (JP) ................. 2000-042303
Feb. 21, 2000 (JP) ................. 2000-042305
Jun. 22, 2000 (JP) ................. 2000-187152--

Signed and Sealed this
Twenty-eighth Day of November, 2017

Joseph Matal
*Performing the Functions and Duties of the
Under Secretary of Commerce for Intellectual Property and
Director of the United States Patent and Trademark Office*